(12) United States Patent
Yumoto et al.

(10) Patent No.: US 7,512,275 B2
(45) Date of Patent: Mar. 31, 2009

(54) IMAGE COLLATING APPARATUS, IMAGE COLLATING METHOD, IMAGE COLLATING PROGRAM AND COMPUTER READABLE RECORDING MEDIUM RECORDING IMAGE COLLATING PROGRAM

(75) Inventors: Manabu Yumoto, Nara (JP); Yasufumi Itoh, Tenri (JP); Takashi Horiyama, Yamatokoriyama (JP); Manabu Onozaki, Nara (JP); Toshiya Okamoto, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 756 days.

(21) Appl. No.: 10/967,145

(22) Filed: Oct. 19, 2004

(65) Prior Publication Data

US 2005/0084155 A1  Apr. 21, 2005

(30) Foreign Application Priority Data

Oct. 21, 2003 (JP) ............................. 2003-360593
Dec. 22, 2003 (JP) ............................. 2003-425432

(51) Int. Cl.
*G06K 9/62* (2006.01)

(52) U.S. Cl. ........................ 382/224; 382/229; 382/284; 382/289

(58) Field of Classification Search .................. 382/224
See application file for complete search history.

(56) References Cited

U.S. PATENT DOCUMENTS 6,031,942 A * 2/2000 Nakayama .................. 382/284
6,707,934 B1 3/2004 Takeda et al.
2002/0006233 A1 * 1/2002 Adachi et al. ............... 382/289
2002/0126903 A1 * 9/2002 Takebe et al. ............... 382/229

FOREIGN PATENT DOCUMENTS

JP    63-211081 A    9/1988

(Continued)

OTHER PUBLICATIONS

Korede Wakatta Biometrics (This is Biometrics), edited by Japan Automatic Identification Systems Association, OHM sha, pp. 3 42-44, Sep. 2001.

(Continued)

*Primary Examiner*—Samir A. Ahmed
*Assistant Examiner*—Aklilu k Woldemariam
(74) *Attorney, Agent, or Firm*—Birch, Stewart, Kolasch & Birch, LLP

(57) ABSTRACT

When first and second images are input, a partial image feature calculating unit calculates feature values of partial images of the two images. A maximum matching score position searching unit searches for a position of the second image that attains to the highest matching score with each of the partial images of the first image. A movement-vector-based similarity score calculating unit calculates similarity between the first and second images, using information related to that partial image whose movement vector has direction and length within a prescribed range, which movement vector representing positional relation between a reference position for measuring, for each of the partial images, the position of the partial image in the first image and the position of the maximum matching score corresponding to the partial image searched out by the maximum matching score position searching unit. The images as the object of collation may belong to the same category classified based on the feature values.

20 Claims, 30 Drawing Sheets

FOREIGN PATENT DOCUMENTS

| | | |
|---|---|---|
| JP | 1-271882 | 10/1989 |
| JP | 3-266184 | 11/1991 |
| JP | 4-316178 | 11/1992 |
| JP | 6-274602 | 9/1994 |
| JP | 7-262380 | 10/1995 |
| JP | 10-187983 | 7/1998 |
| JP | 63-78286 A | 4/1999 |
| JP | 11-259654 | 9/1999 |
| JP | 2000-194862 | 7/2000 |
| JP | 2003-30629 | 1/2003 |
| JP | 2003-323618 A | 11/2003 |

OTHER PUBLICATIONS

Computer Gazou Shori Nyumon (Introduction to computer image processing), Soken Shuppan, pp. 66-69 p. 98, Mar. 1985.

* cited by examiner

| 31: IMAGE EXAMPLE | | | | | |
|---|---|---|---|---|---|
| | 31A | 31B | 31C | 31D | 31E |
| 32: ARRANGEMENT OF PARTIAL IMAGES (MACRO PARTIAL IMAGE) | V V<br>H H | H H<br>H H | H V<br>V H | H H<br>V H | H V<br>H H | CORRESPONDING TO NONE |
| 33: IMAGE CATEGORY NAME | WHORL | PLAIN ARCH | TENTED ARCH | RIGHT LOOP | LEFT LOOP | CORRESPONDING TO NONE |
| 34: CATEGORY NUMBER | CATEGORY "1" | CATEGORY "2" | CATEGORY "3" | CATEGORY "4" | CATEGORY "5" | CATEGORY "0" |

TB1

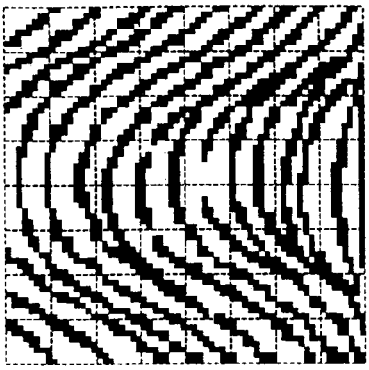
FIG.17A
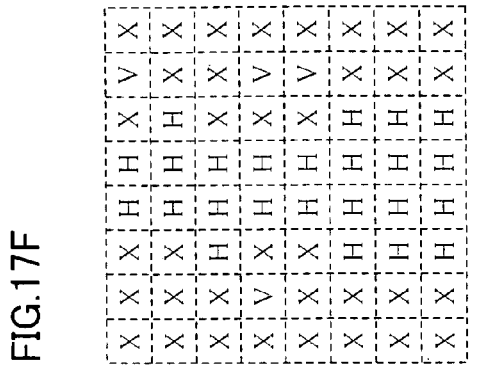
FIG.17B
FIG.17C
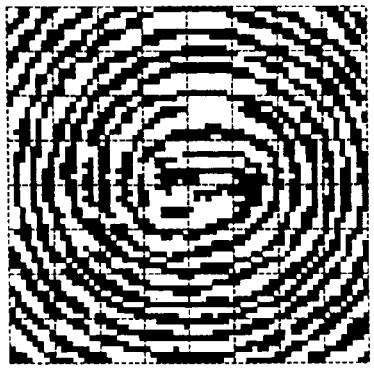
FIG.17D
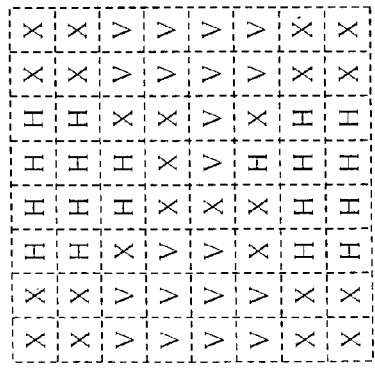
FIG.17E
FIG.17F
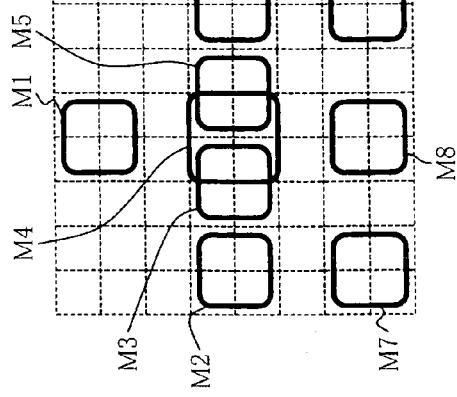

FIG.18A

| MACRO PARTIAL IMAGE M | 1 | 2 | 3 | 4 | 5 | 6 | 7 | 8 | 9 |
|---|---|---|---|---|---|---|---|---|---|
| FEATURE VALUE OF PARTIAL IMAGE 1 | H | V | V | X | X | V | X | H | X |
| FEATURE VALUE OF PARTIAL IMAGE 2 | H | V | X | X | X | V | X | H | X |
| FEATURE VALUE OF PARTIAL IMAGE 3 | H | V | V | X | V | V | X | H | X |
| FEATURE VALUE OF PARTIAL IMAGE 4 | H | V | X | V | V | V | X | H | X |

FIG.18B

| MACRO PARTIAL IMAGE M | 1 | 2 | 3 | 4 | 5 | 6 | 7 | 8 | 9 |
|---|---|---|---|---|---|---|---|---|---|
| NUMBER OF IMAGES DETERMINED TO BE "H" | 4 | 0 | 0 | 0 | 0 | 0 | 0 | 4 | 0 |
| NUMBER OF IMAGES DETERMINED TO BE "V" | 0 | 4 | 2 | 1 | 2 | 4 | 0 | 0 | 0 |
| NUMBER OF IMAGES DETERMINED TO BE "X" | 0 | 0 | 2 | 3 | 2 | 0 | 4 | 0 | 4 |

FIG.18C

| MACRO PARTIAL IMAGE M | 1 | 2 | 3 | 4 | 5 | 6 | 7 | 8 | 9 |
|---|---|---|---|---|---|---|---|---|---|
| DETERMINATION OF "H", "V", "X" OF PARTIAL IMAGES | H | V | X | X | X | V | X | H | X |

FIG.18D  34

| | 1 | 2 | 3 | 4 | 5 | 6 | 7 | 8 | 9 |
|---|---|---|---|---|---|---|---|---|---|
| CATEGORY 1 | H | V | | | | V | | H | |
| CATEGORY 2 | H | | | H | | | | H | |
| CATEGORY 3 | H | | V | | V | | | H | |
| CATEGORY 4 | H | V | | | | | | | H |
| CATEGORY 5 | H | | | | | | V | H | |
| CATEGORY 0 | OTHER THAN COMBINATIONS ABOVE | | | | | | | | |

FIG.18E

| IMAGE CATEGORY DETERMINATION | (MATCHING) CATEGORY 1 |
|---|---|

FIG.19A

| MACRO PARTIAL IMAGE M | 1 | 2 | 3 | 4 | 5 | 6 | 7 | 8 | 9 |
|---|---|---|---|---|---|---|---|---|---|
| FEATURE VALUE OF PARTIAL IMAGE 1 | H | X | X | H | H | V | X | H | X |
| FEATURE VALUE OF PARTIAL IMAGE 2 | H | V | H | H | X | X | X | H | X |
| FEATURE VALUE OF PARTIAL IMAGE 3 | H | X | X | H | H | V | X | H | X |
| FEATURE VALUE OF PARTIAL IMAGE 4 | H | V | H | H | X | X | X | H | X |

FIG.19B

| MACRO PARTIAL IMAGE M | 1 | 2 | 3 | 4 | 5 | 6 | 7 | 8 | 9 |
|---|---|---|---|---|---|---|---|---|---|
| NUMBER OF IMAGES DETERMINED TO BE "H" | 4 | 0 | 2 | 4 | 2 | 0 | 0 | 4 | 0 |
| NUMBER OF IMAGES DETERMINED TO BE "V" | 0 | 1 | 0 | 0 | 0 | 2 | 0 | 0 | 0 |
| NUMBER OF IMAGES DETERMINED TO BE "X" | 0 | 3 | 2 | 0 | 2 | 2 | 4 | 0 | 4 |

FIG.19C

| MACRO PARTIAL IMAGE M | 1 | 2 | 3 | 4 | 5 | 6 | 7 | 8 | 9 |
|---|---|---|---|---|---|---|---|---|---|
| DETERMINATION OF "H", "V", "X" OF PARTIAL IMAGES | H | X | X | H | X | X | X | H | X |

FIG.19D  34

| | 1 | 2 | 3 | 4 | 5 | 6 | 7 | 8 | 9 |
|---|---|---|---|---|---|---|---|---|---|
| CATEGORY 1 | H | V | | | V | | | H | |
| CATEGORY 2 | H | | | H | | | | H | |
| CATEGORY 3 | H | | V | | V | | | H | |
| CATEGORY 4 | H | V | | | | | | | H |
| CATEGORY 5 | H | | | | | | V | H | |
| CATEGORY 0 | OTHER THAN COMBINATIONS ABOVE ||||||||||

FIG.19E

| IMAGE CATEGORY DETERMINATION | (MATCHING) CATEGORY 2 |
|---|---|

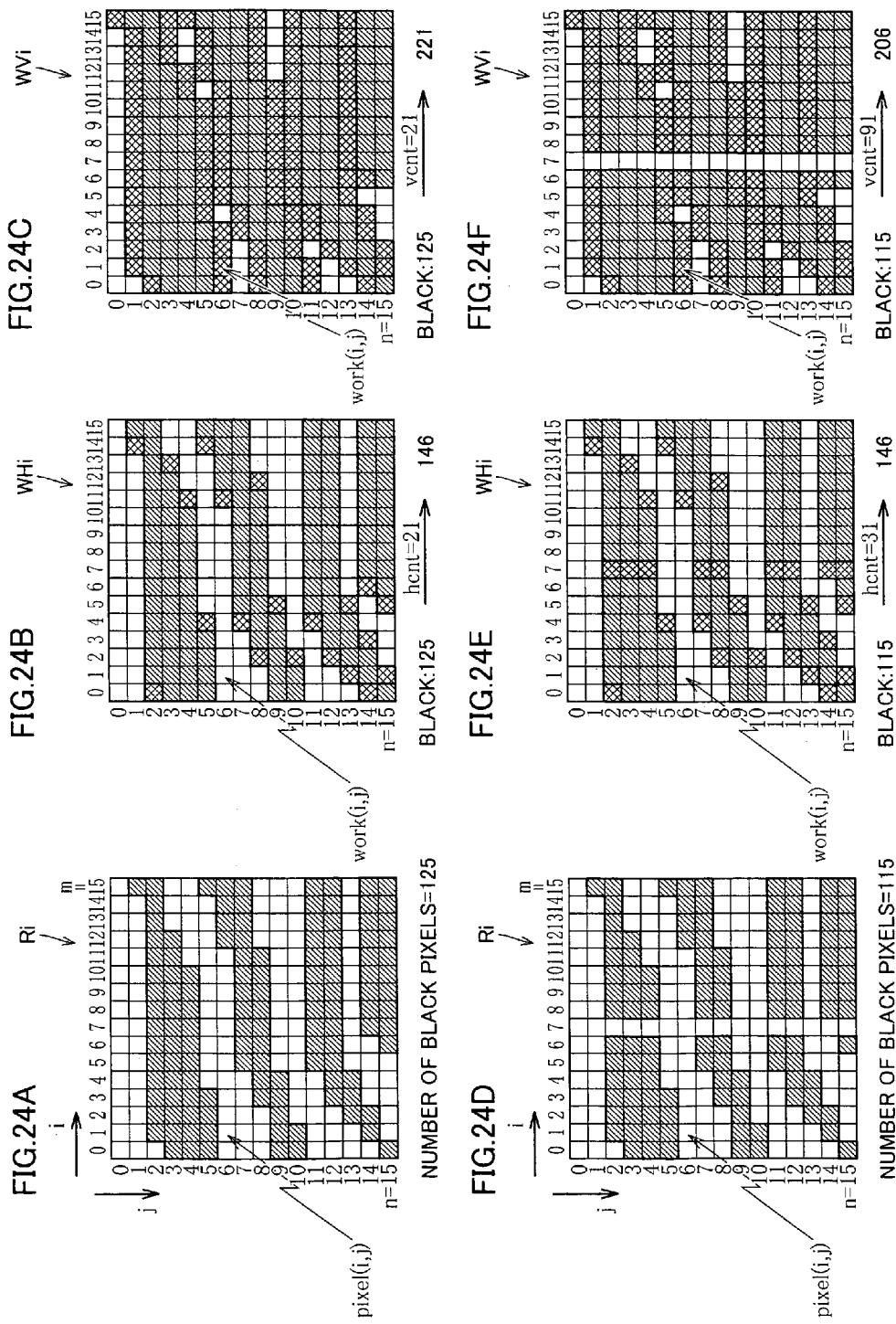

pixel(i,j)

work(i,j)

END

BIFURCATION

FIG.30A PRIOR ART
FIG.30B PRIOR ART
⇩ FEATURE EXTRACTION
⇩ FEATURE EXTRACTION
FIG.30C PRIOR ART
FEATURE COMPARISON ⇔
FIG.30D PRIOR ART
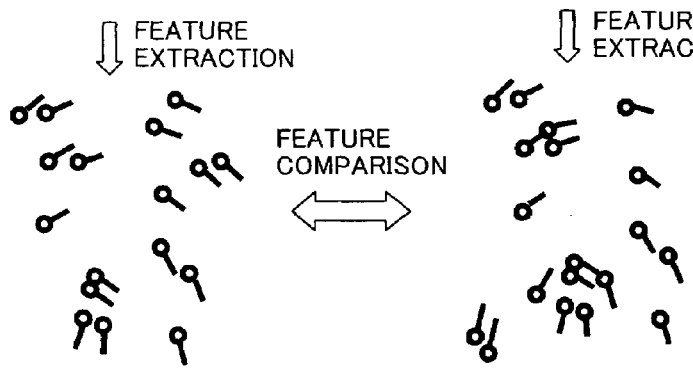
FIG.31A PRIOR ART
α
FIG.31B PRIOR ART
β
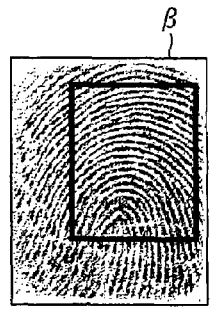
FIG.31C PRIOR ART
α1
FIG.31D PRIOR ART
β1

IMAGE COLLATING APPARATUS, IMAGE COLLATING METHOD, IMAGE COLLATING PROGRAM AND COMPUTER READABLE RECORDING MEDIUM RECORDING IMAGE COLLATING PROGRAM

This nonprovisional application is based on Japanese Patent Applications Nos. 2003-360593 and 2003-425432 filed with the Japan Patent Office on Oct. 21, 2003 and Dec. 22, 2003, respectively, the entire contents of which are hereby incorporated by reference.

BACKGROUND OF THE INVENTION

1. Field of the Invention

The present invention relates to an image collating apparatus, an image collating method, an image collating program and a computer readable recording medium recording the image collating program. More specifically, the present invention relates to an image collating apparatus, an image collating method, an image collating program and a computer readable recording medium recording the image collating program for collating two images with each other.

2. Description of the Background Art

Conventional methods of collating fingerprint images can be classified broadly into image feature matching method and image-to-image matching method. In the former, image feature matching, images are not directly compared with each other but features in the images are extracted and the extracted image features are compared with each other, as described in *KOREDE WAKATTA BIOMETRICS* (*This Is Biometrics*), edited by Japan Automatic Identification Systems Association, OHM sha, pp.42-44. When this method is applied to fingerprint image collation, minutiae (ridge characteristics of a fingerprint that occur at ridge bifurcations and ending, and few to several minutiae can be found in a fingerprint image) such as shown in FIGS. 29A and 29B serve as the image feature. According to this method, minutiae are extracted by image processing from images such as shown in FIGS. 30A to 30D; based on the positions, types and ridge information of the extracted minutiae, a similarity score is determined as the number of minutiae of which relative position and direction match among the images; the similarity score is incremented/decremented in accordance with match/mismatch in, for example, the number of ridges traversing the minutiae; and the similarity score thus obtained is compared with a predetermined threshold for collation and identification.

In the latter method, that is, in image-to-image matching, from images "α" and "β" to be collated with each other shown in FIGS. 31A and 31B, partial images "α1" and "β1", that may correspond to the full area or partial area, are extracted as shown in FIGS. 31C and 31D; matching score between partial images "α1" and "β1" is calculated based on total sum of difference values, correlation coefficient, phase correlation method or group delay vector method, as the similarity score between images "α" and "β"; and the calculated similarity score is compared with a predetermined threshold for collation and identification.

Inventions utilizing the image-to-image matching method have been disclosed, for example, in Japanese Patent Laying-Open No. 63-211081 and Japanese Patent Laying-Open No.63-78286. In the invention of Japanese Patent Laying-Open No. 63-211081, first, an object image is subjected to image-to-image matching, the object image is then divided into four small areas, and in each divided area, positions that attain maximum matching score in peripheral portions are found, and an average matching score is calculated therefrom, to obtain a corrected similarity score. This approach addresses distortion or deformation of fingerprint images that inherently occur at the time the fingerprints are collected. In the invention of Japanese Patent Laying-Open No. 63-78286, one fingerprint image is compared with a plurality of partial areas that include features of the one fingerprint image, while substantially maintaining positional relation among the plurality of partial areas, and total sum of matching scores of the fingerprint image with respective partial areas is calculated and provided as the similarity score.

Generally speaking, the image-to-image matching method is more robust to noise and finger condition variations (dryness, sweat, abrasion and the like), while the image feature matching method enables higher speed of processing then the image-to-image matching as the amount of data to be compared is smaller.

In an image collating process described in Japanese Patent Laying-Open No. 2003-323618, when two images are collated with each other, for each of a plurality of partial areas of one image, the whole area of the other image is searched to identify a position of a partial image that has the maximum matching score. Therefore, there has been a significant burden on computing the position having the maximum matching score. This makes it difficult to realize high speed collation.

At present, biometrics-based technique of personal authentication as represented by fingerprint authentication is just beginning to be applied to consumer products. In this early stage of diffusion, it is desired to make as short as possible the time for personal authentication. Further, for expected application of such authentication function to a personal portable telephone or to a PDA (Personal Digital Assistants), shorter time and smaller power consumption required for authentication are desired, as the battery capacity is limited.

SUMMARY OF THE INVENTION

Therefore, an object of the present invention is to provide an image collating apparatus, an image collating method, an image collating program and a computer readable recording medium recording the image collating program that enable high speed collating process.

In order to attain the above described object, the present invention provides an image collating apparatus, including: a partial image feature value calculating unit for calculating, on each of a plurality of partial area images set in an image, a value reflecting a pattern of the image of the partial area, and outputting the value as a partial image feature value; a maximum matching score position searching unit for searching, for each of a plurality of partial area images set in one of two images, for a maximum matching score position of the other of the two images that is a position of a partial area image having the maximum matching score with the partial area image; a similarity score calculating unit for calculating a similarity score between the two images and outputting an image similarity score, using information related to that partial area of which positional relation amount is within a prescribed range, the positional relation amount representing positional relation between a reference position, for each of the partial areas, for measuring a position of the partial area within the one image, and the maximum matching score position corresponding to the partial area searched out by the maximum matching score position searching unit; and a determining unit for determining whether the two images match or not, based on the image similarity score applied thereto.

The scope of the other image searched by the maximum matching score position searching unit is selected and determined from among a plurality of partial areas set in the other image in accordance with the partial image feature value of the partial area image set in one image.

Therefore, the scope of searches can be limited in accordance with the partial image feature value and (after the scope of searches is narrowed), a position having the highest matching score of the other image can be searched, for each of the plurality of partial areas of the one image. Among the positional relation amounts of the partial areas resulting from the search, the positional relation amount corresponding to a prescribed range is found, and based on information related to that partial area which has the positional relation amount within the prescribed range, similarity score between the two images is calculated.

Therefore, the scope searched for image collation can be limited beforehand, and hence the time necessary for collation can be made shorter and the power consumption of the apparatus can also be reduced.

Preferably, the image collating apparatus described above further includes a category determining unit for determining, based on the partial image feature value output by the partial image feature value calculating unit for one of two images, a category to which one image belongs; and the other image is selected based on the category of the one image determined by the category determining unit.

Therefore, it is possible to select the other image as the object of collation, based on the category to which the one image belongs, determined by the category determining unit. Accordingly, even when there are a number of images as possible objects, the image to be the other image as the object of collation can be limited based on the category to which the one image belongs. Thus, the time necessary for the collating process can be reduced and the power consumption of the apparatus can also be reduced.

In order to attain the above described object, according to another aspect, the present invention provides an image collating apparatus, including: a partial image feature value calculating unit for calculating, on each of a plurality of partial area images set in an image, a value reflecting a pattern of the image of the partial area, and outputting the value as a partial image feature value; a category determining unit for determining, based on the partial image feature value output from the partial image feature value calculating unit on one of two images, a category to which one image belongs; a maximum matching score position searching unit for searching, for each of a plurality of partial area images set in one of two images, for a maximum matching score position of the other image selected based on the category of the one image determined by the category determining unit, which is a position of a partial area image having the maximum matching score with the partial area image; a similarity score calculating unit for calculating a similarity score between the two images and outputting an image similarity score, using information related to that partial area of which positional relation amount is within a prescribed range, the positional relation amount representing positional relation between a reference position, for each of the partial areas, for measuring a position of the partial area within one image, and the maximum matching score position corresponding to the partial area searched out by the maximum matching score position searching unit; and a determining unit for determining whether the two images match or not, based on the image similarity score applied thereto.

The scope of the other image searched by the maximum matching score position searching unit is selected and determined from among a plurality of partial areas set in the other image in accordance with the partial image feature value of the partial area image set in one image.

Therefore, of the image as the object of collation selected based on the category determined by the category determining unit, the scope of searches can be limited in accordance with the partial image feature value and (after the scope of searches is narrowed), a position having the highest matching score of the other image can be searched, for each of the plurality of partial areas of the one image. Among the positional relation amounts of the partial areas resulting from the search, the positional relation amount corresponding to a prescribed range is found, and based on information related to that partial area which has the positional relation amount within the prescribed range, similarity score between the two images is calculated.

Namely, the image to be the object of collation is selected, and the scope of searches for image collation in the selected image is limited in advance. Therefore, the time necessary for the collating process can further be reduced and in addition, the power consumption of the apparatus can further be reduced.

Preferably, the one image and the other image belong to the same category. As the images of the same category are collated with each other, the time necessary for the collating process can further be reduced and in addition, the power consumption of the apparatus can further be reduced.

Preferably, when a plurality of images are prepared as the other image, one image among the plurality of the other images that belong to the same category as the one image is selected with priority. Therefore, images belonging to the same category are collated with priority. Thus, the time necessary for the collating process can further be reduced and in addition, the power consumption of the apparatus can further be reduced.

Preferably, the category determining unit may determine the category of the image based on a combination of partial image feature values of partial images at a plurality of specific positions of the image, calculated by the partial image feature value calculating unit.

Preferably, the plurality of images as the possible object of collation are classified into different categories in advance, and the maximum matching score position searching unit searches the position of the highest matching score in that one of the plurality of images as the other image which belongs to the category selected based on the category determined for the one image by the category determining unit.

Here, the positional relation amount is preferably a movement vector. In this case, similarity score is calculated using information related to such a partial area that is determined to have the movement vector within a prescribed range, for example, the partial area determined to have the same movement vector.

Here, the two images may be fingerprint images. Here, an arbitrary partial area of the fingerprint image includes information such as the ridge number, direction, width or variations thereof characterizing the fingerprint. It is often the case that partial areas of a fingerprint image match at same positions of another fingerprint image obtained from the same fingerprint. Such characteristics are utilized in this approach.

Preferably, the partial image feature value calculating unit calculates maximum length of consecutive pixels along horizontal direction and maximum length of consecutive pixels along vertical direction, and outputs the partial image feature value based on values indicating respective maximum lengths.

Therefore, the partial image feature value can be calculated through a simple procedure of finding the longer one of the maximum length of consecutive pixels in the horizontal direction and the maximum length of consecutive pixels in the vertical direction.

Preferably, the partial image feature value calculating unit extracts strings of pixels representative of horizontal and vertical directions, from each of the partial area images, and based on a number of changes in pixel values in each extracted string of pixels, outputs the partial image feature value.

Therefore, the partial image feature value can be calculated in a simple manner by finding the number of changes in pixel values of pixel strings representing horizontal and vertical directions respectively.

Preferably, the partial image feature value calculating unit provides, for each of the partial area images, an image obtained by displacing each partial area image to the left and to the right by a prescribed number of pixels and superposing the resulting images with each other, and an image obtained by displacing each partial area image upward and downward by a prescribed number of pixels and superposing the resulting images with each other; calculates a difference in pixel value between the image obtained by displacing each partial area image to the left and to the right by a prescribed number of pixels and superposing the resulting images with each other and the corresponding partial area image and a difference in pixel value between the image obtained by displacing each partial area image-upward and downward by a prescribed number of pixels and superposing the resulting images with each other and the corresponding partial area image; and outputs the partial image feature value based on the calculated differences.

Therefore, the partial image feature value can be calculated in a simple manner by finding a difference in pixel values obtained by superposing the original image and the images moved upward and downward of each partial area, and a difference in pixel values obtained by superposing the original image and the images moved to the left and right of each partial area.

Preferably, the partial image feature value is one of three different values. Therefore, the partial image feature value can be limited to one of three values, and the collation processing using the feature value will not be complicated.

Preferably, the three different values respectively represent that the partial area image has a pattern extending along the vertical direction, a pattern extending along the horizontal direction and other pattern.

Though the partial image feature value preferably assumes any of three different types, the types are not limited thereto, and there may be four or other types.

By the partial image feature value, it is possible to indicate whether the image pattern of the partial area extends in the vertical direction or horizontal direction, or other direction.

Preferably, the pattern extending in the vertical direction is vertical stripes and the pattern extending in the horizontal direction is horizontal stripes. Thus, when the image is a fingerprint image, the vertical or horizontal stripes of the fingerprint can be indicated by the partial image feature value.

Preferably, the maximum matching score position searching unit searches that partial area set in the other image which has the same partial image feature value as the partial image feature value of the partial area image set in one image.

Therefore, it is possible to specify as the scope of searches the partial area that has the same partial image feature value.

Preferably, when the partial image feature value of the partial area image in the one image indicates that the pattern extends along one of the vertical direction and the horizontal direction, the maximum matching score position searching unit searches that partial area of the image set in the other image of which partial image feature value indicates the pattern extending along the one direction and searches that partial area of the image set in the other image of which partial image feature value indicates the other pattern.

Therefore, the partial area that has the same partial image feature value and the partial area indicating other pattern can be specified as the scope of searching.

Preferably, the partial area of which partial image feature value indicates other pattern is excluded from the scope of searching by the maximum matching score position searching unit.

Therefore, the image area having a pattern extending in an indistinct direction that cannot be classified to vertical or horizontal direction is left outside the scope of searching. Thus, degradation in collation accuracy caused by the use of vague partial image feature value can be prevented.

In order to attain the above described object, according to a still another aspect, the present invention provides an image collating method, including: partial image feature value calculating step of calculating, on each of a plurality of partial area images set in an image, a value reflecting a pattern of the image of the partial area, and outputting the value as a partial image feature value; maximum matching score position searching step of searching, for each of a plurality of partial area images set in one of two images, for a maximum matching score position of the other of the two images that is a position of a partial area image having the maximum matching score with the partial area image; similarity score calculating step of calculating a similarity score between the two images and outputting an image similarity score, using information related to that partial area of which positional relation amount is within a prescribed range, the positional relation amount representing positional relation between a reference position, for each of the partial areas, for measuring a position of the partial area within the one image, and the maximum matching score position corresponding to the partial area searched out in the maximum matching score position searching step; and determining step of determining whether the two images match or not, based on the image similarity score applied thereto.

The scope of the other image searched in the maximum matching score position searching step is selected and determined from among a plurality of partial areas set in the other image in accordance with the partial image feature value of the partial area image set in the one image.

Therefore, the scope of searches can be limited in accordance with the partial image feature value and (after the scope of searches is narrowed), a position having the highest matching score of the other image can be searched, for each of the plurality of partial areas of the one image. Among the positional relation amounts of the partial areas resulting from the search, the positional relation amount corresponding to a prescribed range is found, and based on information related to that partial area which has the positional relation amount within the prescribed range, similarity score between the two images is calculated.

Therefore, the scope searched for image collation can be limited beforehand, and hence the time necessary for collation can be made shorter, and when the method is executed on an apparatus, the power consumption of the apparatus can also be reduced.

In order to attain the above described object, according to a still further aspect, the present invention provides an image collating method, including: partial image feature value calculating step of calculating, on each of a plurality of partial area images set in an image, a value reflecting a pattern of the image of the partial area, and outputting the value as a partial image feature value; category determining step of determining, based on the partial image feature value output in the partial image feature value calculating step on one of two images, a category to which the one image belongs; maximum matching score position searching step of searching, for each of a plurality of partial area images set in one of two images, for a maximum matching score position of the other image selected based on the category of the one image determined by the category determining step, which is a position of a partial area image having the maximum matching score with the partial area image; similarity score calculating step of calculating a similarity score between the two images and outputting an image similarity score, using information related to that partial area of which positional relation amount is within a prescribed range, the positional relation amount representing positional relation between a reference position, for each of the partial areas, for measuring a position of the partial area within the one image, and the maximum matching score position corresponding to the partial area searched out in the maximum matching score position searching step; and determining step of determining whether the two images match or not, based on the image similarity score applied thereto.

The scope of the other image searched in the maximum matching score position searching step is selected and determined from among a plurality of partial areas set in the other image in accordance with the partial image feature value of the partial area image set in the one image.

Therefore, of the image as the object of collation selected based on the category determined by the category determining step, the scope of searches can be limited in accordance with the partial image feature value and (after the scope of searches is narrowed), a position having the highest matching score of the other image can be searched, for each of the plurality of partial areas of the one image. Among the positional relation amounts of the partial areas resulting from the search, the positional relation amount corresponding to a prescribed range is found, and based on information related to that partial area which has the positional relation amount within the prescribed range, similarity score between the two images is calculated.

Namely, the image to be the object of collation is selected, and the scope of searches for image collation in the selected image is limited in advance. Therefore, the time necessary for the collating process can further be reduced and in addition, the power consumption of the apparatus can further be reduced.

In order to attain the above described object, according to a still further aspect, the present invention provides an image collating program causing a computer to execute the above described image collating method.

In order to attain the above described object, according to a still further aspect, the present invention provides a computer readable recording medium recording the image collating program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A to 9C represent a specific example of the collating process in accordance with Embodiment 1 of the present invention.

FIG. 16 shows exemplary contents of Table TB1 in accordance with Embodiment 2 of the present invention.

FIGS. 17A to 17F illustrate category determination using macro partial images, in accordance with Embodiment 2 of the present invention.

FIGS. 18A to 18E illustrate an example of category determination calculation in accordance with Embodiment 2 of the present invention.

FIGS. 19A to 19E illustrate another example of category determination calculation in accordance with Embodiment 2 of the present invention.

FIGS. 24A to 24F schematically represent an image feature value calculating process in accordance with Embodiment 4 of the present invention.

FIGS. 30A to 30D represent the image feature matching method as another prior art example.

FIGS. 31A to 31D schematically represent minutiae as image feature used in the prior art.

DESCRIPTION OF THE PREFERRED EMBODIMENTS

Embodiments of the present invention will be described with reference to the figures. Here, two image data are collated with each other. Though fingerprint data will be described as an exemplary image data to be collated, the image is not limited thereto, and the present invention may be applicable to image data of other biometrics that are similar among samples (individuals) but not identical, or other image data of linear patterns.

Embodiment 1

Figure 1:
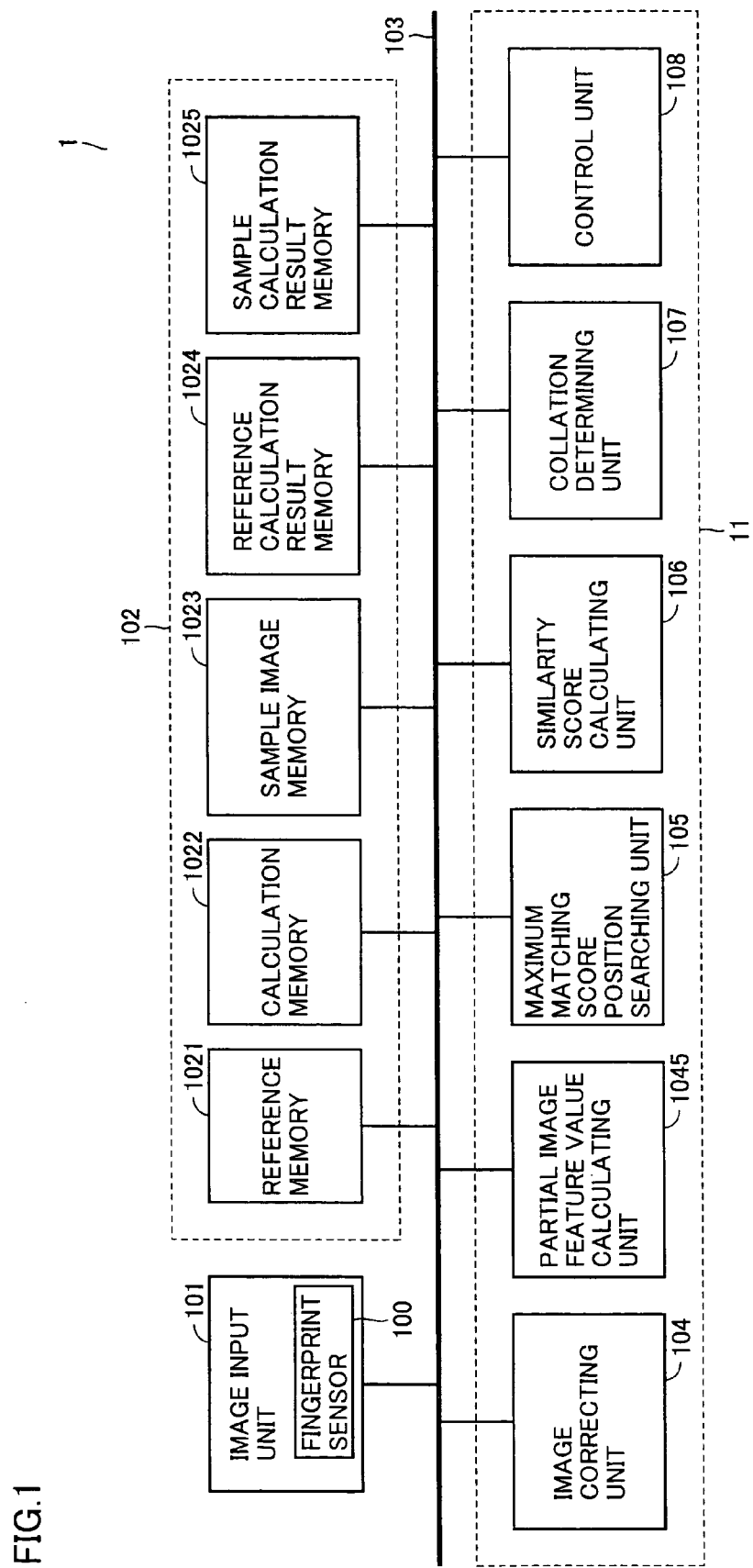
FIG. 1 is a block diagram of an image collating apparatus in accordance with Embodiment 1 of the present invention.
Figure 2:
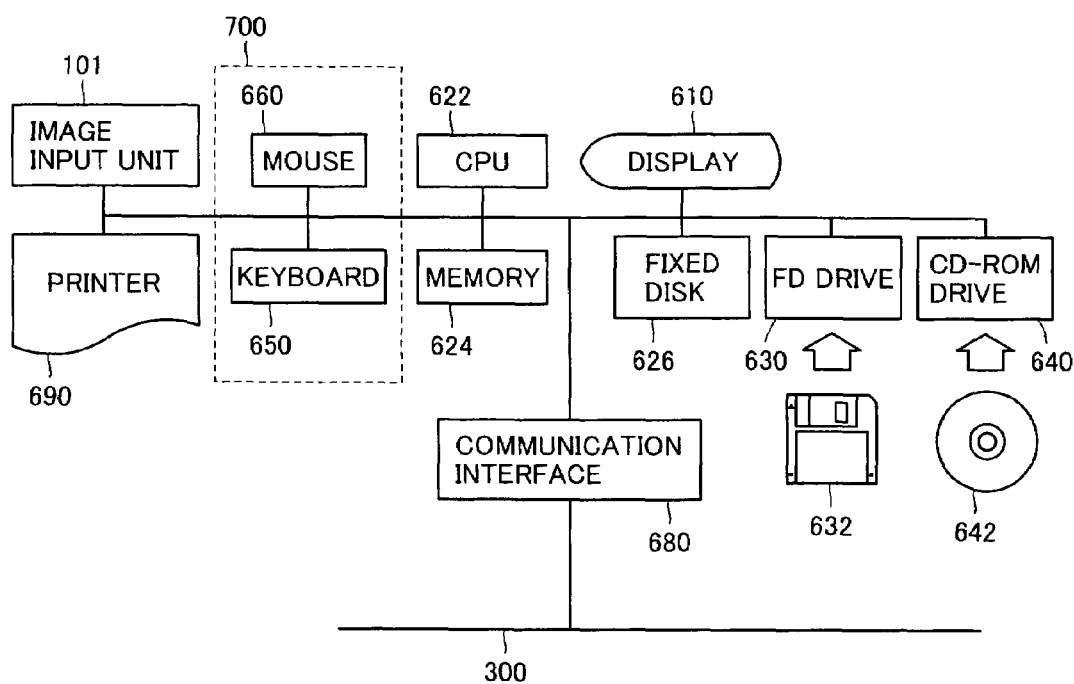
FIG. 2 is an illustration representing a configuration of a computer to which the image collating apparatus of the present invention is mounted.

FIG. 1 is a block diagram representing an image collating apparatus in accordance with Embodiment 1. FIG. 2 shows a configuration of a computer in which the image collating apparatus in accordance with various embodiments is mounted. Referring to FIG. 2, the computer includes an image input unit 101, a display 610 such as a CRT (Cathode Ray Tube) or a liquid crystal display, a CPU (Central Processing Unit) 622 for central management and control of the computer itself, a memory 624 including an ROM (Read Only Memory) or an RAM (Random Access Memory), a fixed disk 626, an FD drive 630 on which an FD (flexible disk) 632 is detachably mounted and which accesses to FD 632 mounted thereon, a CD-ROM drive 640 on which a CD-ROM (Compact disc Read Only Memory) is detachably mounted and which accesses to the mounted CD-ROM 642, a communication interface 680 for connecting the computer to a communication network 300 for establishing communication, a printer 690, and an input unit 700 having a key board 650 and a mouse 660. These components are connected through a bus for communication.

The computer may be provided with a magnetic tape apparatus accessing to a cassette type magnetic tape that is detachably mounted thereto.

Referring to FIG. 1, image collating apparatus 1 includes an image input unit 101, a memory 102 that corresponds to memory 624 or fixed disk 626 shown in FIG. 2, a bus 103 and a collating unit 11. Memory 102 includes a reference memory 1021, a calculation memory 1022, a sample image memory 1023, a partial image feature value calculation result memory 1024 for a reference image, and a partial image feature value calculation result memory 1025 for a sample image. Collating unit 11 includes an image correcting unit 104, a partial image feature value calculating unit 1045, maximum matching score position searching unit 105, a movement-vector-based similarity score calculating unit (hereinafter referred to as a similarity score calculating unit) 106, a collation determining unit 107 and a control unit 108. Functions of these units in collating unit 11 are realized when corresponding programs are executed.

Image input unit 101 includes a fingerprint sensor 100, and outputs a fingerprint image data that corresponds to the fingerprint read by fingerprint sensor 100. Fingerprint sensor 100 may be an optical, a pressure-type, a static capacitance type or any other type sensor. Memory 102 stores image data and various calculation results. Reference memory 1021 stores data of a plurality of partial areas of template fingerprint images. Calculation memory 1022 stores results of various calculations. Sample image memory 1023 stores fingerprint image data output from image input unit 101. Partial image feature value calculation result memory 1024 for the reference image and a partial image feature value calculation result memory 1025 for the sample image store results of calculation by a partial image feature value calculating unit 1045, which will be described later. Bus 103 is used for transferring control signals and data signals between each of these units.

Image correcting unit 104 performs density correction of the fingerprint image input from image input unit 101. Partial image feature value calculating unit 1045 calculates, for each of the plurality of partial area images set in the image, a value corresponding to a pattern of the partial image, and outputs, as partial image feature value, the result of calculation corresponding to reference memory 1021 to partial image feature value calculation result memory 1024 for the reference image, and the result of calculation corresponding to sample image memory 1023 to partial image feature value calculation result memory 1025 for the sample image.

Maximum matching score position searching unit 105 reduces the scope of searches in accordance with the partial image feature value calculated by partial image feature value calculating unit 1045, uses a plurality of partial areas of one fingerprint image as templates, and searches for a position of the other fingerprint image that attains to the highest matching score with the templates. Namely, this unit serves as a so called template matching unit.

Using the information of the result from maximum matching score position searching unit 105 stored in memory 102, similarity score calculating unit 106 calculates the movement-vector-based similarity score, which will be described later. Collation determining unit 107 determines a match/mismatch, based on the similarity score calculated by similarity score calculating unit 106. Control unit 108 controls processes performed by various units of collating unit 11.

Figure 3:
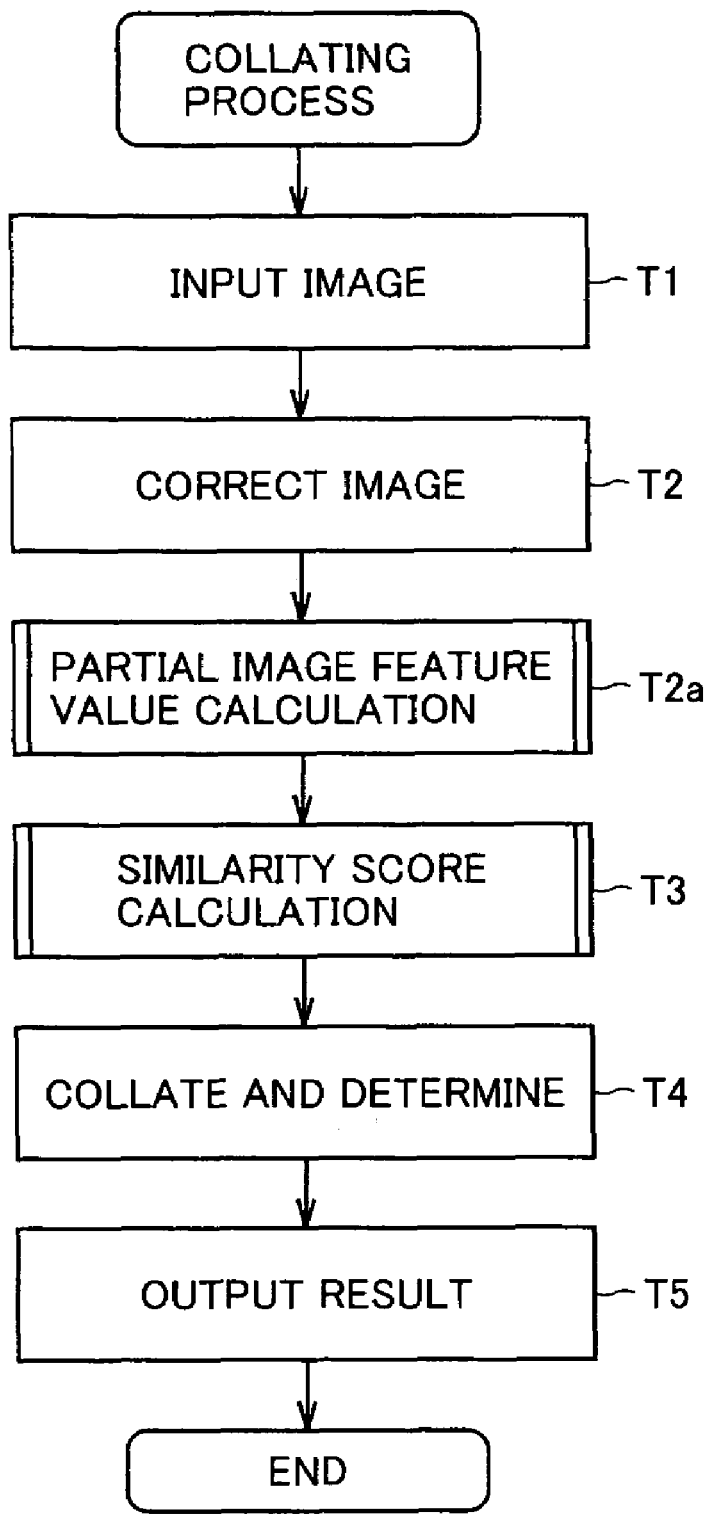
FIG. 3 is a flow chart of a procedure for collating two images with each other by the image collating apparatus in accordance with the present invention.

The procedure for collating images "A" and "B" that correspond to two fingerprint images, for collating two fingerprint images in image collating apparatus 1 shown in FIG. 1 will be described with reference to the flow chart of FIG. 3.

First, control unit 108 transmits an image input start signal to image input unit 101, and thereafter waits until an image input end signal is received. Image input unit 101 receives as an input image A for collation, which image is stored at a prescribed address of memory 102 through bus 103 (step T1). In the present embodiment, it is assumed that the image is stored at a prescribed address of reference memory 1021. After the input of image A is completed, image input unit 101 transmits the image input end signal to control unit 108.

Receiving the image input end signal, control unit 108 again transmits the image input start signal to image input unit 101, and thereafter, waits until the image input end signal is received. Image input unit 101 receives as an input image B for collation, which image is stored at a prescribed address of memory 102 through bus 103 (step T1). In the present embodiment, it is assumed that the image is stored at a prescribed address of sample image memory 1023. After the input of image B is completed, image input unit 101 transmits the image input end signal to control unit 108.

Thereafter, control unit 108 transmits an image correction start signal to image correcting unit 104, and thereafter, waits until an image correction end signal is received. In most cases, the input image has uneven image quality, as tones of pixels and overall density distribution vary because of variations in characteristics of image input unit 101, dryness of fingerprints and pressure with which fingers are pressed. Therefore, it is not appropriate to use the input image data directly for collation. Image correcting unit 104 corrects the image quality of input image to suppress variations of conditions when the image is input (step T2). Specifically, for the overall image corresponding to the input image or small areas obtained by dividing the image, histogram planarization, as described in *Computer GAZOU SHORI NYUMON* (*Introduction to computer image processing*), SOKEN SHUPPAN, p.98, or image thresholding (binarization), as described in *Computer GAZOU SHORI NYUMON* (*Introduction to computer image processing*), SOKEN SHUPPAN, pp. 66-69, is performed, on images stored in memory 102, that is, images "A" and "B" stored in reference memory 1021 and sample image memory 1023.

After the end of image correcting process on images "A" and "B", image correcting unit 104 transmits the image correction end signal to control unit 108.

Thereafter, on the image that has been subjected to image correcting process by image correcting unit 104, the process for calculating partial image feature value (step T2a) is performed.

Figure 4:
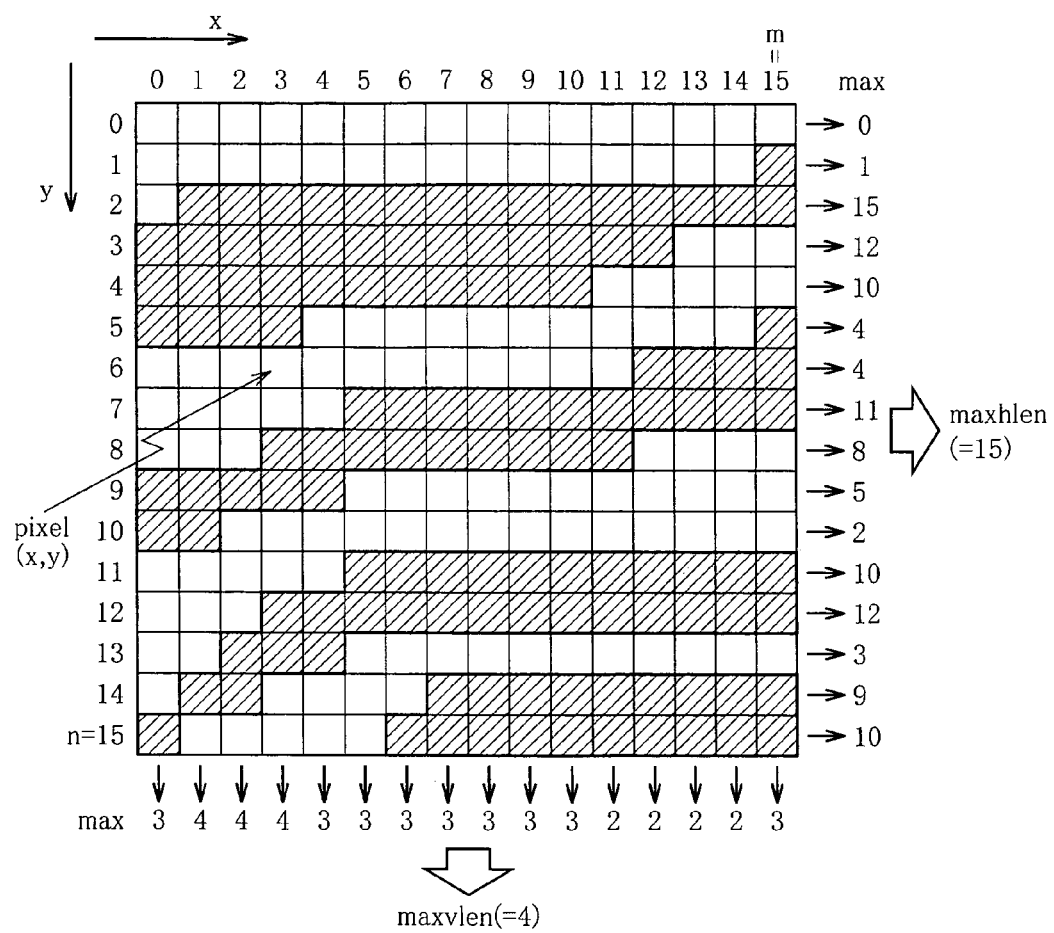
FIG. 4 schematically illustrates calculation of partial image feature value in accordance with Embodiment 1 of the present invention.

Calculation of the partial image feature value will be schematically described with reference to FIG. 4. FIG. 4 is an illustration of a partial image, on which maximum pixel numbers in horizontal/vertical directions are specified. The partial image of this illustration consists of 16 pixels×16 pixels (=m× n), that is, a partial area having 16 pixels both along the horizontal direction (x direction) and vertical direction (y direction). In FIG. 4, an arbitrary pixel value (x, y) is depicted.

In the calculation of partial image feature value in accordance with Embodiment 1, a value corresponding to the pattern of the partial image as an object of calculation is output as the partial image feature value. Specifically, maximum number of consecutive black pixels in the horizontal direction "maxhlen" (a value indicating a tendency that the pattern extends along the horizontal direction (such as horizontal stripe)) and maximum number of consecutive black pixels in the vertical direction "maxvlen" (a value indicating a tendency that the pattern extends along the vertical direction (such as vertical stripe)) are compared, and if the direction having a relatively large value is horizontal, "H" representing horizontal (horizontal stripe) is output, if it is vertical, "V" representing vertical (vertical stripe) is output, and otherwise, "X" is output. Even when the result is determined to be "H" or "V", "X" is output unless the maximum number of consecutive black pixels is at least the lower limit value "hlen0" or "vlen0" set for both directions. These conditions can be given by the following expressions. If maxhlen>maxvlen and maxhlen>hlen0, then "H" is output, if maxvlen>maxhlen and maxvlen>vlen0, then "V" is output, and otherwise, "X" is output.

Figure 5:
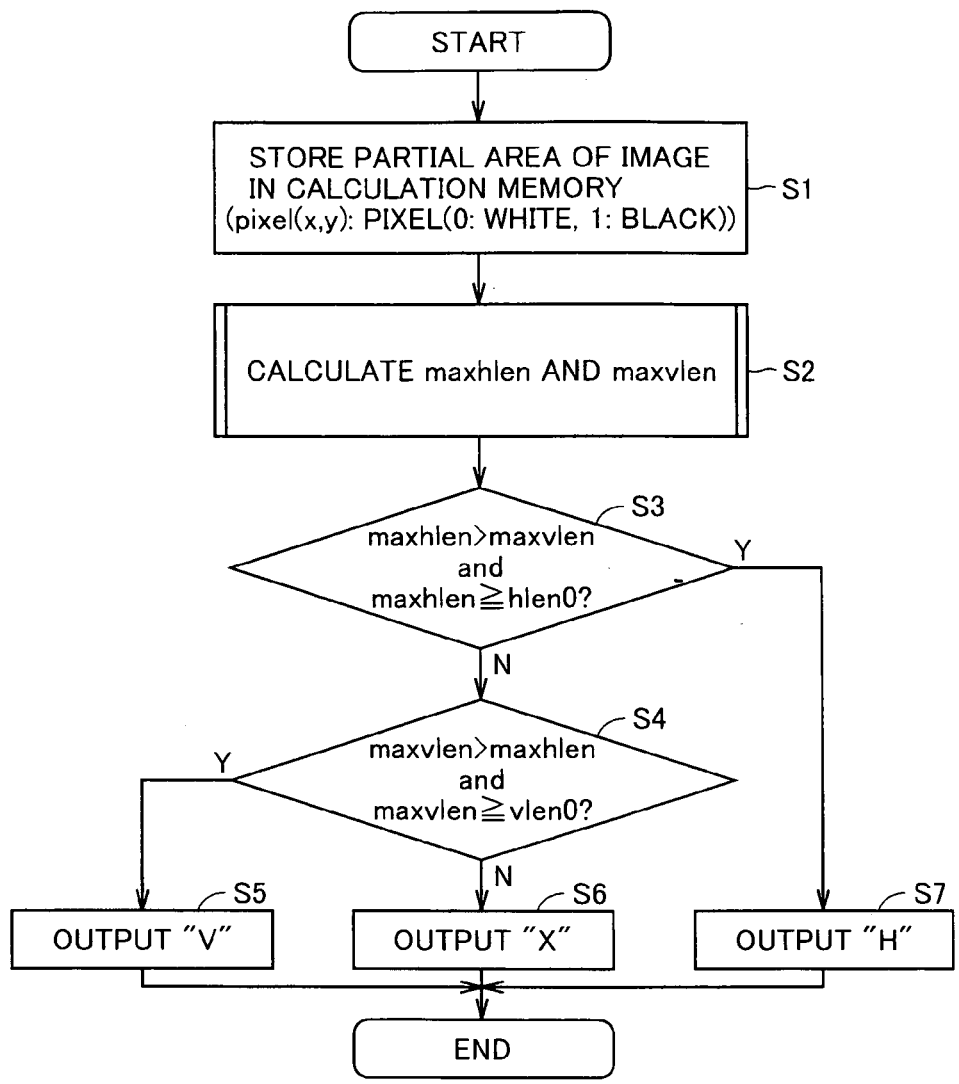
FIG. 5 is a flow chart of the process for calculating partial image feature value in accordance with Embodiment 1 of the present invention.

FIG. 5 is a flow chart representing the process for calculating the partial image feature value in accordance with Embodiment 1 of the present invention. The process flow is repeated on each partial image "Ri" of "n" partial area images of the reference image stored in reference memory 1021 as the object of calculation, and the calculated result values are stored in partial image feature value calculation result memory 1024 for the reference image, in correspondence to respective partial images Ri. Similarly, the process flow is repeated on each partial image "Ri" of "n" partial area images of the sample image stored in sample image memory 1023, and the calculated result values are stored in partial image feature value calculation result memory 1025 for the sample image, in correspondence to respective partial images Ri. Details of the process for calculating the partial image feature value will be described with reference to the flow chart of FIG. 5.

Control unit 108 transmits a partial image feature value calculation start signal to partial image feature value calculating unit 1045, and thereafter waits until a partial image feature value calculation end signal is received. Partial image feature value calculating unit 1045 reads the data of partial image "Ri" as the object of calculation from reference memory 1021 or from sample image memory 1023, and temporarily stores the same in calculation memory 1022 (step S1). Partial image feature value calculating unit 1045 reads the stored data of partial image "Ri", and calculates the maximum number of consecutive black pixels along the horizontal direction "maxhlen" and the maximum number of consecutive black pixels along the vertical direction "maxvlen" (step S2). The process for calculating the maximum number of consecutive black pixels along the horizontal direction "maxhlen" and the maximum number of consecutive black pixels along the vertical direction "maxvlen" will be described with reference to FIGS. 6 and 7.

Figure 6:
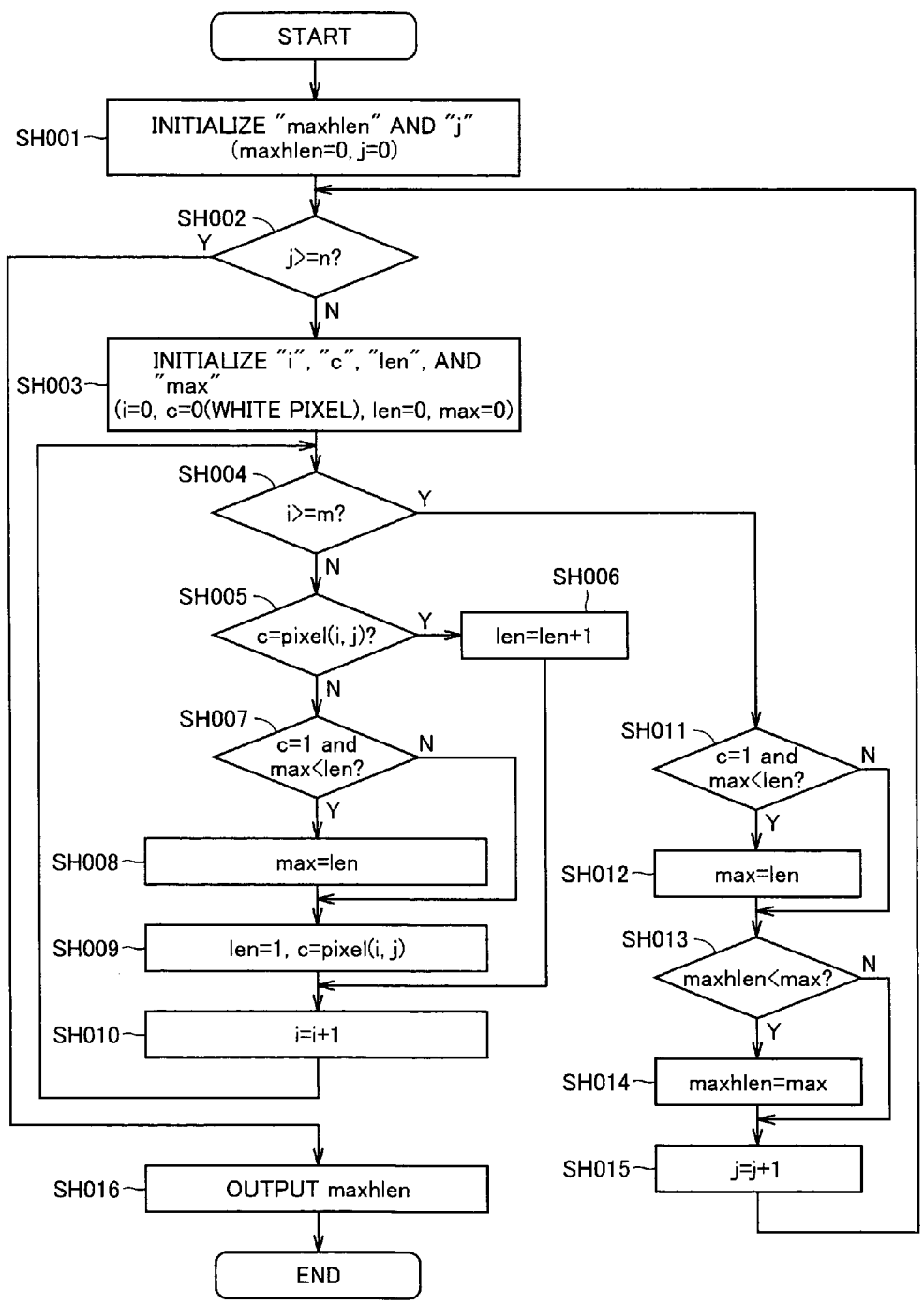
FIG. 6 is a flow chart of a process for calculating maximum number of consecutive black pixels in horizontal direction in a partial image, in accordance with Embodiment 1 of the present invention.

FIG. 6 is a flow chart of a process (step S2) for calculating the maximum number of consecutive black pixels along the horizontal direction "maxhlen" in the process for calculating the partial image feature value (step T2a) in accordance with Embodiment 1 of the present invention. Partial image feature value calculating unit 1045 reads the partial image "Ri" from calculation memory 1022, and initializes the maximum number of consecutive black pixels along the horizontal direction "maxhlen" and a pixel counter "j" for the vertical direction. Namely, maxhlen=0 and j=0 (step SH001).

Thereafter, the value of pixel counter "j" for the vertical direction is compared with the maximum number of pixels "n" along the vertical direction (step SH002). If j>n, step SH016 is executed, and otherwise, step SH003 is executed. In Embodiment 1, n=15 and at the start of processing j=0, and therefore, the flow proceeds to step SH003.

In step SH003, a pixel counter "β" for the horizontal direction, previous pixel value "c", present number of consecutive pixels "len" and the maximum number of consecutive black pixels "max" of the present row are initialized. Namely, i=0, c=0, len=0 and max=0 (step SH003). Thereafter, the value of pixel counter "β" for the horizontal direction is compared with the maximum number of pixels "m" along the horizontal direction (step SH004). If i>m, step SH011 is executed, and otherwise, step SH005 is executed. In Embodiment 1, m=15 and at the start of processing i=0, and therefore, the flow proceeds to step SH005.

In step SH005, the previous pixel value "c" is compared with the pixel value "pixel (i, j)" at the coordinates (i, j) as the present object of comparison, and if c=pixel (i, j), step SH006 is executed, and otherwise, step SH007 is executed. In Embodiment 1, "c" has been initialized to "0" (white pixel), and pixel (0, 0) is "0" (white pixel) as shown in FIG. 4. Therefore, c=pixel (i, j), so that the flow proceeds to step SH006. In step SH007, whether the condition "c"=1 and "max<len" holds or not is determined. If it is YES, "len" is input to "max" in step SH008, and the flow proceeds to step SH009. If it is NO in step SH007, "len" is replaced by "1" and "c" is replaced by "pixel (i, j)" in step SH009. In step SH006, len=len+1 is executed. In Embodiment 1, "len" has been initialized to len=0, and therefore, by the addition of "1", len=1. Thereafter, the flow proceeds to step SH010.

In step SH010, i=i+1 is executed, that is, the value "i" of horizontal pixel counter is incremented. In Embodiment 1, "i" has been initialized to i=0, and therefore, by the addition of "1", i attains to i=1. Then, the flow returns to step SH004. As the pixel values of the 0th row, that is, pixel (i, 0) are all white and "0", steps SH004 to SH010 are repeated until i attains to i=15. At the time when i attains to i=15 after the process of step SH010, respective values would be i=15, c=0 and len=15. The flow proceeds to step SH004 in this state. As m=15 and i=15, the flow further proceeds to step SH011.

In step SH011, if the condition "c=1" and "max<len" is satisfied, "max" is replaced by "len" in step SH012, and otherwise, the flow proceeds to step SH013. Here, c=0, len=15 and max=0, and therefore, the flow proceeds to step SH013.

In step SH013, the maximum number of consecutive black pixels "maxhlen" along the horizontal direction of the previous rows is compared with the maximum number of consecutive black pixels "max" of the present row. If maxhlen<max, "maxhlen" is replaced by "max" in step SH014, and otherwise, step SH015 is executed. Here, maxhlen=0 and max=0, and therefore, the flow proceeds to step SH015.

In step SH015, j=j+1 is executed, that is, the value of pixel counter "j" for the vertical direction is incremented by 1. As j=0 at present, the value will be j=1, and the flow returns to SH002.

Thereafter, processes of steps SH002 to SH015 are repeated for j=1 to 14, and at the time point when j attains to j=15 after the end of step SH015, the value of pixel counter "j" for the vertical direction is compared with the maximum pixel number "n" in the vertical direction. As a result of comparison, if j>n, step SH016 is executed, and otherwise, step SH003 is executed. Here, j=15 and n=15, and therefore, the flow proceeds to step SH016.

In step SH016, "maxhlen" will be output. As can be seen from the foregoing description and FIG. 4, as "maxhlen" representing the maximum number of consecutive black pixels along the horizontal direction, max value of "15" of y=2nd row is stored. Therefore, "maxhlen=15" is output.

Figure 7:
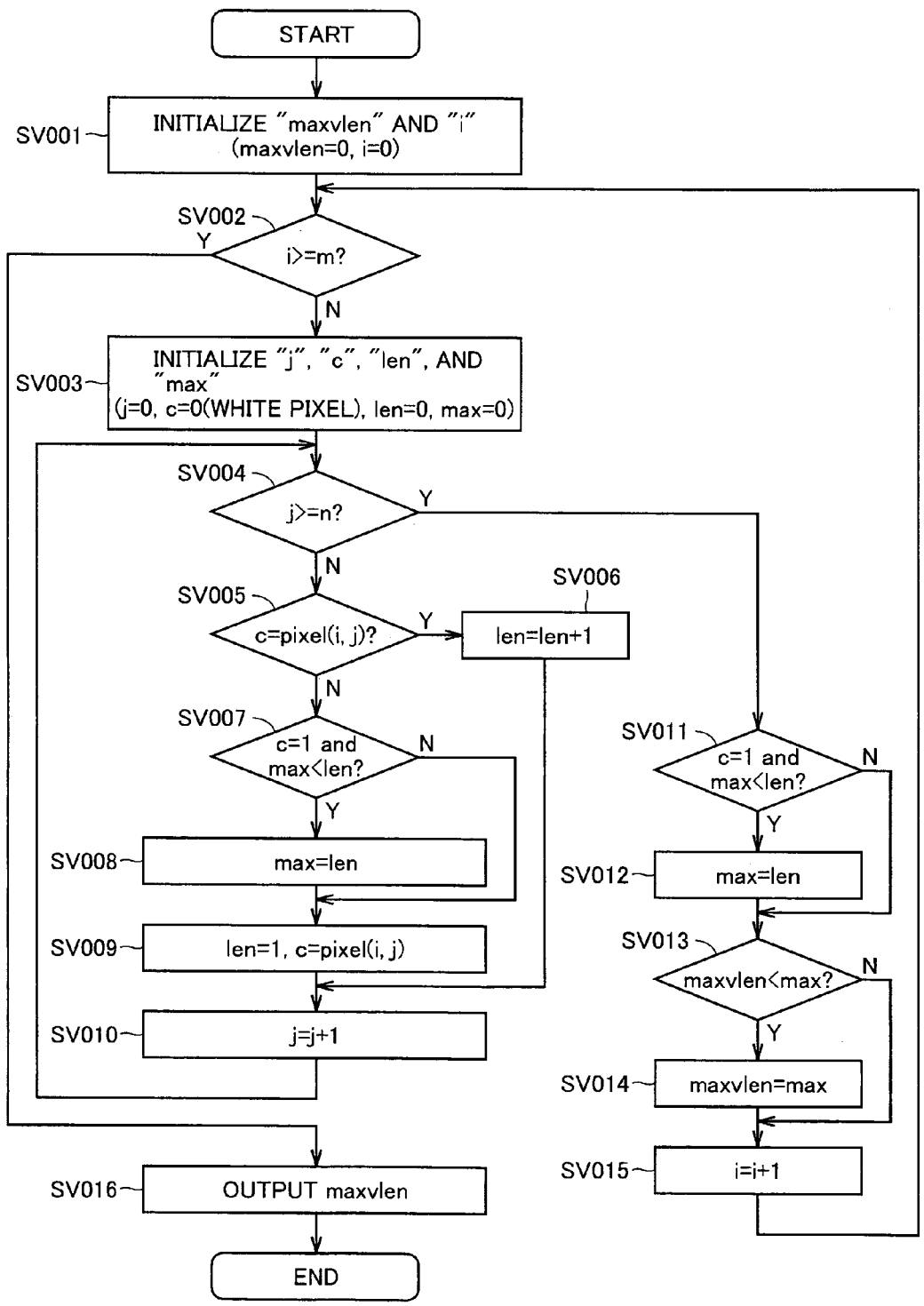
FIG. 7 is a flow chart of a process for calculating maximum number of consecutive black pixels in vertical direction in a partial image, in accordance with Embodiment 1 of the present invention.

FIG. 7 is a flow chart of the process (step S2) for calculating the maximum number of consecutive black pixels "maxvlen" along the vertical direction, in the process (step T2a) for calculating partial image feature value in accordance with Embodiment 1. It is apparent that the processes of steps SV001 to SV016 of FIG. 7 are basically the same as the processes shown in the flow chart of FIG. 16, and therefore, detailed description will not be repeated. As a result of execution of steps SV001 to SV016, "4", which is the "max" value along the "x" direction in FIG. 4, is output as the maximum number of consecutive black pixels "maxvlen" along the vertical direction.

Contents of the processes to be executed on "maxhlen" and "maxvlen" output through the procedure above will be described, returning to step S3 of FIG. 5.

In step S3 of FIG. 5, "maxhlen", "maxvlen" and a prescribed lower limit "hlen0" of the maximum number of consecutive black pixels are compared with each other. If maxhlen>maxvlen and maxhlen>hlen0, then step S7 is executed, and otherwise, step S4 is executed. At present, maxhlen=15 and maxveln=4, and if "hlen0" is set to "2", then the flow proceeds to step S7. In this step, "H" is output to the feature value storing area of partial image "Ri" for the original image of partial image feature value calculation result memory 1024 for the reference image, or partial image feature value calculation result memory 1025 for the sample image, and a partial image feature value calculation end signal is transmitted to control unit 108.

If "heln0" has been set to "5" in the foregoing, the flow next proceeds to step S4, if maxvlen>maxhlen and maxvlen>vlen0, step S5 is executed next, and otherwise step S6 is executed next. Here, maxhlen=15, maxvlen=4 and hlen0=5, therefore, the flow proceeds to step S6, "X" is output to the feature value storing area of partial image "Ri" for the original image of partial image feature value calculation result memory 1024 for the reference image, or partial image feature value calculation result memory 1025 for the sample image, and partial image feature value calculation end signal is transmitted to control unit 108.

Assuming that the output values in step S2 are maxhlen=4, maxvlen=15 and hlen0=2, if maxhlen>maxvlen and maxhlen>hlen0 in step S3, step S7 is executed next, and otherwise, step S4 is executed next.

In step S4, if maxvlen>maxhlen and maxvlen≧vlen0, step S5 is executed next, and otherwise, step S6 is executed next.

In step S5, "V" is output to the feature value storing area of partial image "Ri" for the original image of partial image feature value calculation result memory 1024 for the reference image, or partial image feature value calculation result memory 1025 for the sample image, and partial image feature value calculation end signal is transmitted to control unit 108.

As described above, partial image feature value calculating unit 1045 in accordance with Embodiment 1 extracts (identifies) strings of pixels in the horizontal and vertical directions of a partial image "Ri" of the image as an object of calculation (see FIG. 4), and based on the number of black pixels in each extracted string of pixels, determines whether the pattern of the partial image has a tendency to extend along the horizontal direction (for example, tendency to be horizontal stripes) or a tendency to extend along the vertical direction (for example, tendency to be vertical stripes) or neither of these tendencies, so as to output a value corresponding to the result of determination (any of "H", "V" and "X"). The output value represents the feature value of the partial image. Though the feature value is calculated based on the number of black pixels here, the feature value may be calculated in the similar manner based on the number of consecutive white pixels.

Images "A" and "B" that have been subjected to image correcting process by image correcting unit 104 and of which partial image feature values have been calculated by partial image feature value calculating unit 1045 in the manner described above, are next subjected to similarity score calculation, that is, collating process (step T3). The process will be described with reference to the flow chart of FIG. 8.

Control unit 108 transmits a template matching start signal to maximum matching score position searching unit 105, and waits until a template matching end signal is received. Maximum matching score position searching unit 105 starts a template matching process represented by steps S001 to S007. In step S001, a counter variable "i" is initialized to "1". In step S002, an image of a partial area defined as partial image "Ri" of image "A" is set as a template to be used for the template matching. Though the partial image "Ri" has a rectangular shape for simplicity of calculation, the shape is not limited thereto.

In step S0025, the result of calculation "CRi" of the reference partial image feature value for the partial image "Ri" is read from memory 1024.

In step S003, a portion of image "B" having the highest matching score with the template set in step S002, that is, a portion at which image data best match the template, is searched for. In order to reduce the burden of search process, the following calculation is performed only on that partial area which has the result of calculation "CM" of partial image feature value for the sample image corresponding to image "B" of the same value as the result of calculation "CRi" of the reference partial image feature value for the partial image "Ri" corresponding to image "A". We represent pixel density of coordinates (x, y), with a an upper left corner of partial image "Ri" used as the template being the origin by "Ri (x, y)", pixel density of coordinates (s, t), with an upper left corner of image "B" being the origin by "B(s, t)", the width and height of partial image "Ri" by "w" and "h", respectively, possible maximum density of each pixel in images "A" and "B" by "V0", and the matching score at coordinates (s, t) of image "B" by "Ci(s, t)", which matching score is calculated in accordance with the following equation (1), based on density difference between each of the pixels.

$$Ci(s, t) = \sum_{y=1}^{h} \sum_{x=1}^{w} (V0 - |Ri(x, y) - B(s + x, t + y)|) \quad (1)$$

In image "B", the coordinates (s, t) are successively updated and the matching score "C(s, t)" is calculated. A position having the highest value is considered as the maximum matching score position, the image of the partial area at that position is represented as partial area "Mi", and the matching score at that position is represented as maximum matching score "Cimax". In step S004, the maximum matching score "Cimax" in image "B" for the partial image "Ri" calculated in step S003 is stored in a prescribed address of memory 102. In step S005, a movement vector "Vi" is calculated in accordance with equation (2), which is stored at a prescribed address of memory 102.

Here, if the image "B" is scanned to identify the partial area "Mi" at the position "M" having the highest matching score with the partial image "Ri", based on the partial image "Ri" at position "P" in image "A", a directional vector from position "P" to position "M" is referred to as a movement vector. This is because the image "B" seems to have moved from image "A" as a reference, as the finger is placed in various manners on the fingerprint sensor 100.

$$Vi=(Vix, Viy)=(Mix-Rix, Miy-Riy) \quad (2)$$

In equation (2), variables "Rix" and "Riy" are "x" and "y" coordinates at the reference-position of partial image "Ri", that correspond, by way of example, to the upper left corner of partial image "Ri" in image "A". Variables "Mix" and "Miy" are "x" and "y" coordinates at the position of maximum matching score "Cimax" as the result of search of partial area "Mi", which correspond, by way of example, to the upper left corner coordinates of partial area "Mi" at the matched position in image "B".

In step S006, whether the counter variable "i" is not larger than the total number of partial areas "n" or not is determined. If the variable "i" is not larger than the total number "n" of the partial area, the flow proceeds to step S007, and otherwise, the process proceeds to step S008. In step S007, "1" is added to variable value "i". Thereafter, as long as the variable value "i" is not larger than the total number "n" of partial areas, steps S002 to S007 are repeated. Namely, for every partial area "Ri", template matching is performed on limited partial areas that have the result of calculation "CM" of partial image feature value for the sample image corresponding to image "B" of the same value as the result of calculation "CRi" of the reference partial image feature value for the partial image "Ri" corresponding to image "A", and the maximum matching score "Cimax" of each partial image "Ri" and the movement vector "Vi" are calculated.

Maximum matching score position searching unit 105 stores the maximum matching score "Cimax" and the movement vector "Vi" for every partial image "Ri" calculated successively as described above at prescribed addresses of memory 102, and thereafter transmits a template matching end signal to control unit 108 to end the processing.

Thereafter, control unit 108 transmits a similarity score calculation start signal to similarity score calculating unit 106, and waits until a similarity score calculation end signal is received. Similarity score calculating unit 106 calculates the similarity score through the process of steps S008 to S020 of FIG. 8, using information such as the movement vector "Vi" and the maximum matching score "Cimax" of each partial image "Ri" obtained by template matching and stored in memory 102.

In step S008, similarity score "P (A, B)" is initialized to 0. Here, the similarity score "P(A, B)" is a variable storing the degree of similarity between images "A" and "B". In step S009, an index "i" of the movement vector "Vi" as a reference is initialized to "1". In step S010, similarity score "Pi" related to the reference movement vector "Vi" is initialized to "0". In step S011, an index "j" of movement vector "Vj" is initialized to "1". In step S012, vector difference "dVij" between reference movement vector "Vi" and movement vector "Vj" is calculated in accordance with equation (3).

$$dVij=|Vi-Vj|=sqrt((Vix-Vjx)^2+(Viy-Vjy)^2) \quad (3)$$

Here, variables "Vix" and "Viy" represent "x" direction and "y" direction components, respectively, of the movement vector "Vi", variables "Vjx" and "Vjy" represent "x" direction and "y" direction components, respectively, of the movement vector "Vj", variable "sqrt(X)" represents square root of "X" and "X^2" represents calculation of square of "X".

In step S013, vector difference "dVij" between movement vectors "Vi" and "Vj" is compared with a prescribed constant value "ε", so as to determine whether the movement vectors "Vi" and "Vj" can be regarded as substantially the same vectors. If the vector difference "dVij" is smaller than the constant value "ε", movement vectors "Vi" and "Vj" are regarded as substantially the same, and the flow proceeds to step S014. If the difference is larger than the constant value, the movement vectors cannot be regarded as substantially the same, and the flow proceeds to step S015. In step S014, the similarity score "Pi" is incremented in accordance with equations (4) to (6).

$$Pi = Pi + \alpha \quad (4)$$

$$\alpha = 1 \quad (5)$$

$$\alpha = Cjmax \quad (6)$$

In equation (4), variable "α" is a value for incrementing the similarity score "Pi". If "α" is set to 1 as represented by equation (5), similarity score "Pi" represents the number of partial areas that have the same movement vector as reference movement vector "Vi". If "α" is set to α=Cjmax as represented by equation (6), the similarity score "Pi" would be the total sum of the maximum matching scores obtained through the template matching of partial areas that have the same movement vector as the reference movement vector "Vi". The value of variable "α" may be made smaller, in accordance with the magnitude of vector difference "dVij".

In step S015, whether the value of index "j" is smaller than the total number "n" of partial areas or not is determined. If the value of index "j" is smaller than the total number "n" of partial areas, the flow proceeds to step S016, and if it is larger, the flow proceeds to step S017. In step S016, the value of index "j" is incremented by 1. By the process from step S010 to S016, the similarity score "Pi" is calculated, using the information of partial areas determined to have the same movement vector as the reference movement vector "Vi". In step S017, the similarity score using movement vector "Vi" as a reference is compared with the variable "P(A, B)", and if the similarity score "Pi" is larger than the largest similarity score (value of variable "P(A, B)") obtained by that time, the flow proceeds to step S018, and otherwise the flow proceeds to step S019.

In step S018, a value of similarity score "Pi" using movement vector "Vi" as a reference is set to the variable "P(A, B)". In steps S017 and S018, if the similarity score "Pi" using movement vector "Vi" as a reference is larger than the maximum value of the similarity score (value of variable "P (A, B)") calculated by that time using other movement vector as a reference, the reference movement vector "Vi" is considered to be the best reference among the values of index "i" used to that time point.

In step S019, the value of index "i" of reference movement vector "Vi" is compared with the number (value of variable n) of partial areas. If the value of index "i" is smaller than the number "n" of partial areas, the flow proceeds to step S020, in which the index value "i" is incremented by 1.

From step S008 to step S020, similarity between images "A" and "B" is calculated as the value of variable "P(A, B)". Similarity score calculating unit 106 stores the value of variable "P (A, B)" calculated in the above described manner at a prescribed address of memory 102, and transmits a similarity score calculation end signal to control unit 108 to end the process.

Thereafter, control unit 108 transmits a collation determination start signal to collation determining unit 107, and waits until a collation determination end signal is received (step T4). Collation determining unit 107 collates and determines (step T4). Specifically, the similarity score represented by the value of variable "P(A, B)" stored in memory 102 is compared with a predetermined threshold "T" for collation. As a result of comparison, if "P (A, B)"≧T, it is determined that images "A" and "B" are taken from one same fingerprint, a value, for example, "1", indicating a "match" is written to a prescribed address of memory 102 as a collation result, and if not, the images are determined to be taken from different fingerprints and a value, for example, "0", indicating a "mismatch" is written to a prescribed address of memory 102, that is, calculation memory 1022, as a collation result. Thereafter, a collation determination end signal is transmitted to control unit 108, and the process ends.

Finally, control unit 108 outputs the collation result stored in memory 102 through display 610 or printer 690 (step T5), and the image collating process ends.

In the present embodiment, part of or all of the image correcting unit 104, partial image feature value calculating unit 1045, maximum matching score position searching unit 105, similarity score calculating unit 106, collation determining unit 107 and control unit 108 may be implemented by an ROM such as memory 624 storing the process procedure as a program and a processor such as CPU 622.

A specific example of the collating process in accordance with Embodiment 1 and effects attained thereby will be described. As described above, the collating process characteristic of the present embodiment is the partial image feature value calculating process (T2a) and the similarity score calculating process (T3) of the flow chart shown in FIG. 3. Therefore, in the following, partial images and image feature values of images that have been subjected to image input (T1) and image correction (T2) will be described in the order of input.

Figures 9A, 9B, 9C:
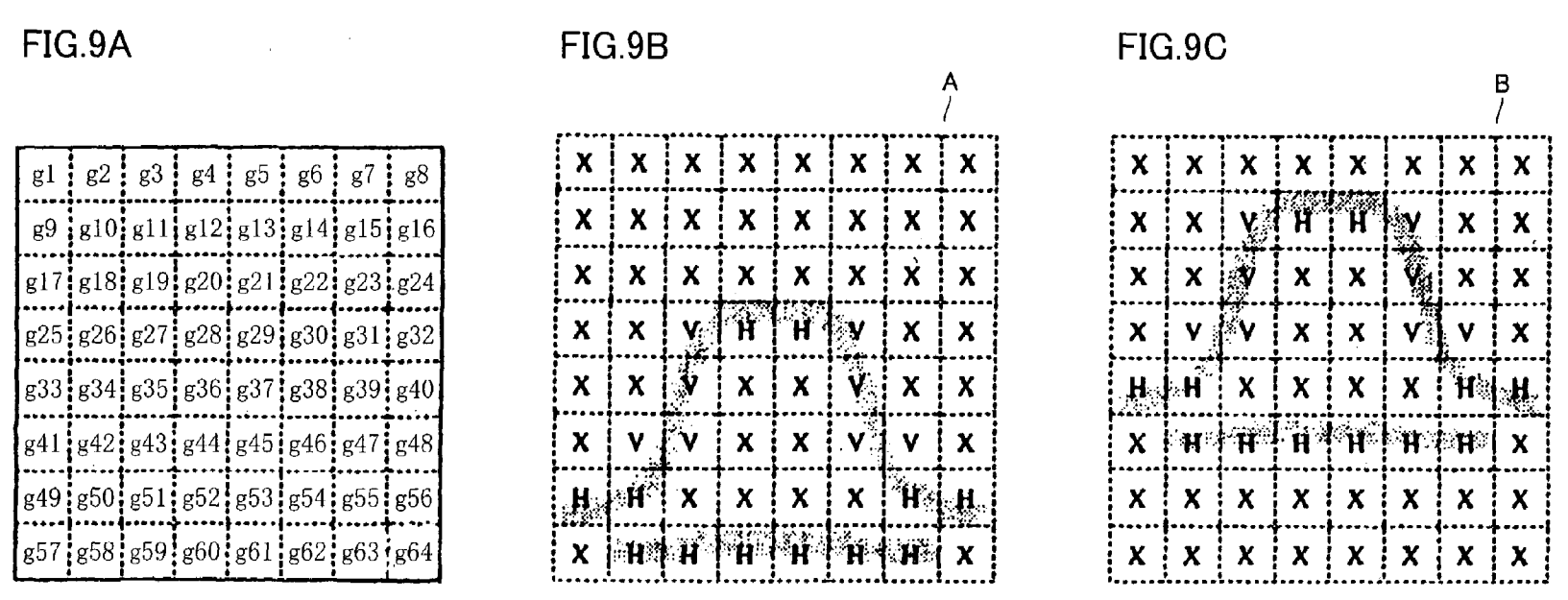

FIG. 9B shows an image "A" that has been subjected to the steps of image input (T1) and image correction (T2) and stored in sample image memory 1023. FIG. 9C shows an image "B" that has been subjected to the steps of image input (T1) and image correction (T2) and stored in reference image memory 1021. The collating process described above will be applied to images "A" and "B", in the following manner.

First, referring to FIG. 9A, how to specify partial image positions in the image will be described. The shape (form, size) of the image of FIG. 9A is the same as that of images "A" and "B" of FIGS. 9B and 9C. The image of FIG. 9A is divided by a mesh into 64 partial images each having the same (rectangular) shape. Numerical values 1 to 64 are allocated to these 64 partial images from the upper right one to the lower left one of FIG. 9A, to identify the position of 64 partial images in the image. Here, 64 partial images are identified using the numerical values indicating the corresponding positions, such as partial images "g1", "g2", ... "g64". As the images of FIGS. 9A, 9B and 9C have the same shape, the images "A" and "B" of FIGS. 9B and 9C may also be divided into 64 partial images and the positions can be identified similarly as partial images "g1", "g2", ... "g64".

Figures 10A, 10B, 10C:
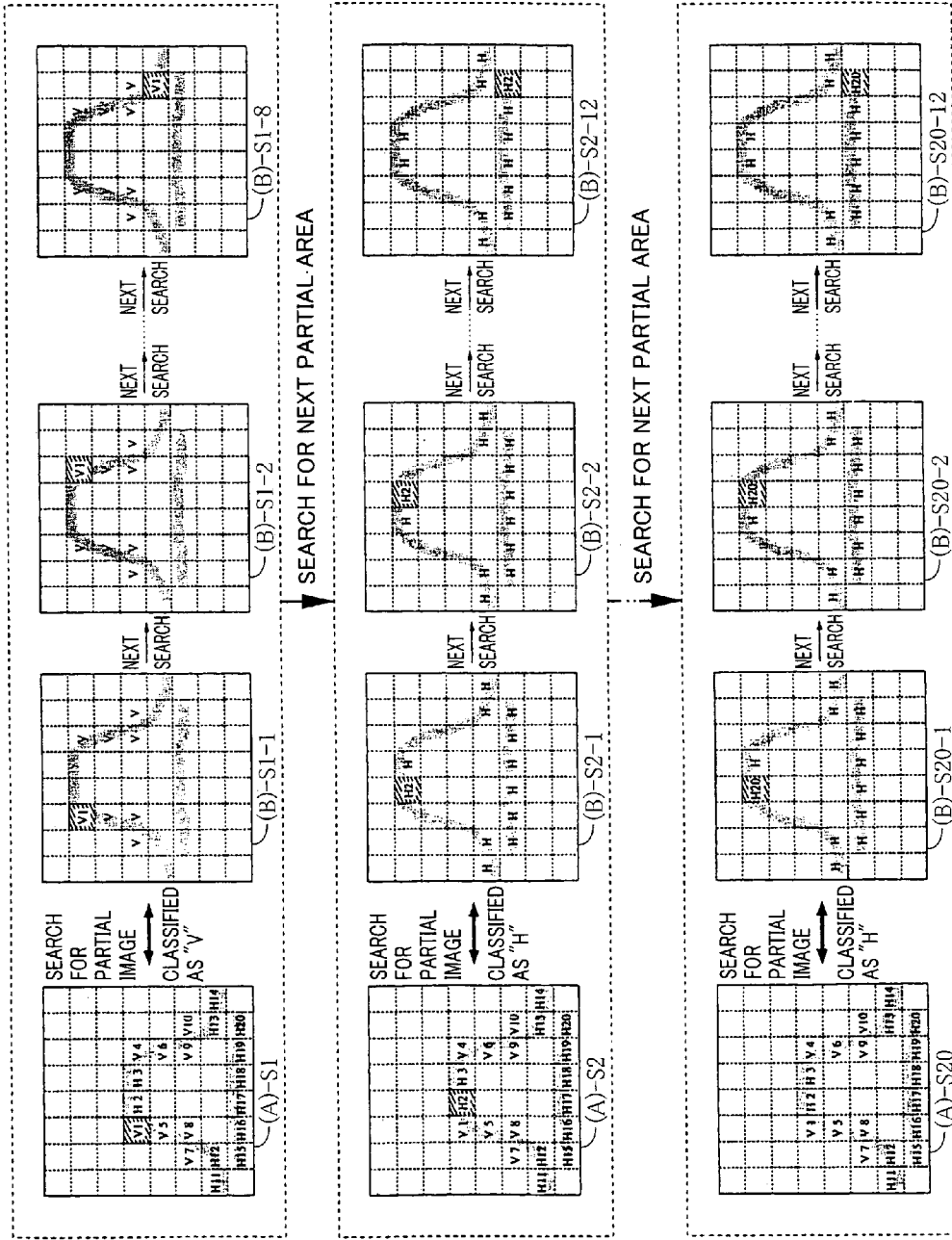
FIGS. 10A to 10C represent a specific example of the collating process in accordance with Embodiment 1 of the present invention.

FIGS. 10A to 10C illustrate the procedure for collating images "A" and "B" with each other. As described above, in Embodiment 1, a partial image that has the partial image feature value corresponding to a partial image having a partial image feature value of "H" or "V" of image "A" is searched in image "B". Therefore, among the partial images of image "A", the first partial image having the partial image feature value of "H" or "V" will be the first object partial image. The image (A)-S1 of FIG. 10A shows partial images of image "A" with partial image feature values, and the partial image "g27" as the first partial image having the "H" of "V" partial image feature value, that is, "V1" is hatched.

Figure 8:
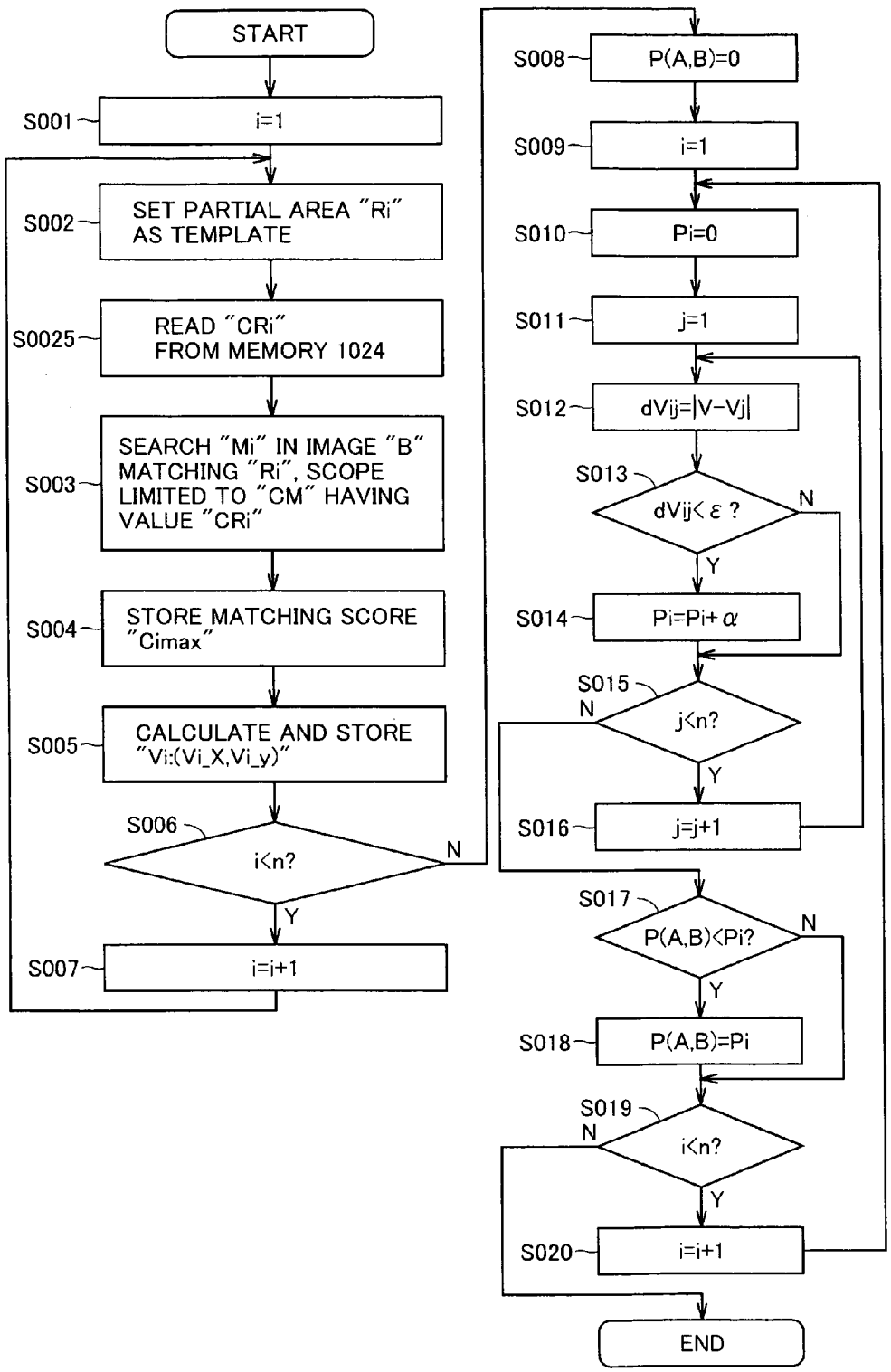
FIG. 8 is a flow chart of the process of calculating similarity score in accordance with Embodiment 1 of the present invention.

As can be seen from the image (A)-S1, the first partial image feature value is "V". Therefore, among partial images of image "B", the partial image having the partial image feature value "V" would be the object of search. The image (B)-S1-1 of FIG. 10A shows image "B" in which the partial image "g11" as the first partial image having the partial image feature value "V", that is, "V1" is hatched. On this partial image, the process represented by steps S002 to S007 of FIG. 8 is performed. Thereafter, the process is performed on the partial image "g14" having the partial image feature value of "V" following the partial image "g11", that is, "V1" (image (B)-S1-2 of FIG. 10A), followed by processes on partial images "g19", "g22", "g26", "g27", "g30" and "g31" (image (B)-S1-8 of FIG. 10A). As the series of processes is complete for the partial image "g27" as the first partial image having the partial image feature value of "H" or "V" of image A, the process represented by steps S002 to S007 of FIG. 8 is performed similarly for the partial image "g28" that is the next partial image having the partial image feature value of "H" or "V" (image (A)-S2 of FIG. 10B). As the partial image feature value of partial image "g28" is "H", the series of processes is performed on partial image "g12" (image (B)-S2-1 of FIG. 10B), image "g13" (image (B)-S2-2 of FIG. 10B) and "g33", "g34", "g39", "g40", "g42" to "g46", "g47" (image (B)-S2-12 of FIG. 10B) that have the partial image feature value of "H" in image "B". Thereafter, on partial images "g29", "g30", "g35", "g38", "g42", "g43", "g46", "g47", "g49", "g50", "g55", "g56", "g58" to "g62" and "g63" (image (A)-S20 of FIG. 10C) that have the partial image feature value of "H" or "V" in image "A", processes similar to those described with reference to image (B)-S20-1, image (B)-S20-2, . . . image (B)-S20-12 are performed.

The number of partial images searched for in images "A" and "B" in the present embodiment is given by (number of partial images in image "A" that have partial image feature value "V"×number of partial images in image "B" that have partial image feature value "V"+number of partial images in image "A" that have partial image feature value "H"×number of partial images in image "B" that have partial image feature value "H").

The number of partial images searched for by the procedure of Embodiment 1 in the example shown in FIGS. 10A to 10C is 8×8+12×12=208.

Figures 11A, 11D:
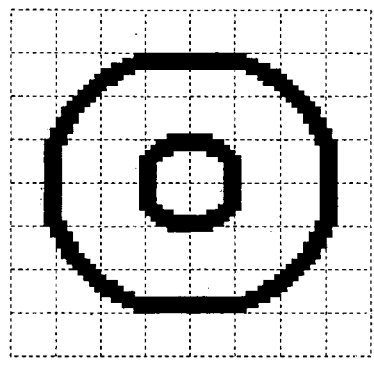
FIGS. 11A to 11F represent a specific example of the collating process in accordance with Embodiment 1 of the present invention.
Figures 11B, 11E:
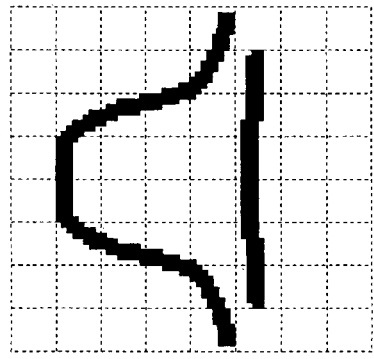

As the partial image feature value in accordance with the present embodiment depends also on the pattern of the image, an example having a pattern different from that of FIGS. 9B and 9C will be described. FIGS. 11A and 11B represent sample image "A" and reference image "B", which are different from images "A" and "B" of FIGS. 9B and 9C, and FIG. 11C shows a reference image "C", which is different from reference image "B" of FIG. 9C.

Figures 11C, 11F:
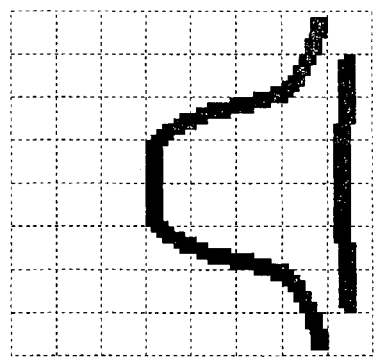

FIGS. 11D, 11E and 11F respectively show partial image feature values of images "A", "B" and "C" shown in FIGS. 11A, 11B and 11C.

For the sample image "A" shown in FIG. 11A, the number of partial images in reference image "C" shown in FIG. 11C is similarly given as (number of partial images in image "A" that have partial image feature value "V"×number of partial images in image "C" that have partial image feature value "V"+number of partial images in image "A" that have partial image feature value "H"×number of partial images in image "C" that have partial image feature value "H"). Referring to FIGS. 11D and 11F, the number of partial images to be searched for is 8×12+12×16=288.

Though the areas having the same partial image feature value are searched in the examples described above, it is not necessary, and when the partial image feature value as a reference is "H", the areas of the sample image that have the partial image feature values of "H" and "X" may be searched, and when the partial image feature value as a reference is "V", the areas of the sample image that have the partial image feature values of "V" and "X" may be searched, so as to improve collation accuracy.

The partial image feature value "X" means that the corresponding partial image has a pattern that cannot be specified as vertical stripe or horizontal stripe. When higher speed of collating is desired, the partial areas having the partial image feature value "X" may be excluded from the scope of search by maximum matching score position searching unit 105.

Embodiment 2

Embodiment 2 introduces a technique that enables faster collating when there are a large number of reference images prepared for collation with the sample image. Specifically, the large number of reference images are classified into a plurality of categories in advance. When the sample image is input, to which category the sample image belongs is determined, and the sample image is collated with each of the reference images belonging to the category selected in view of the category of the sample image known from the result of determination.

Figure 12:
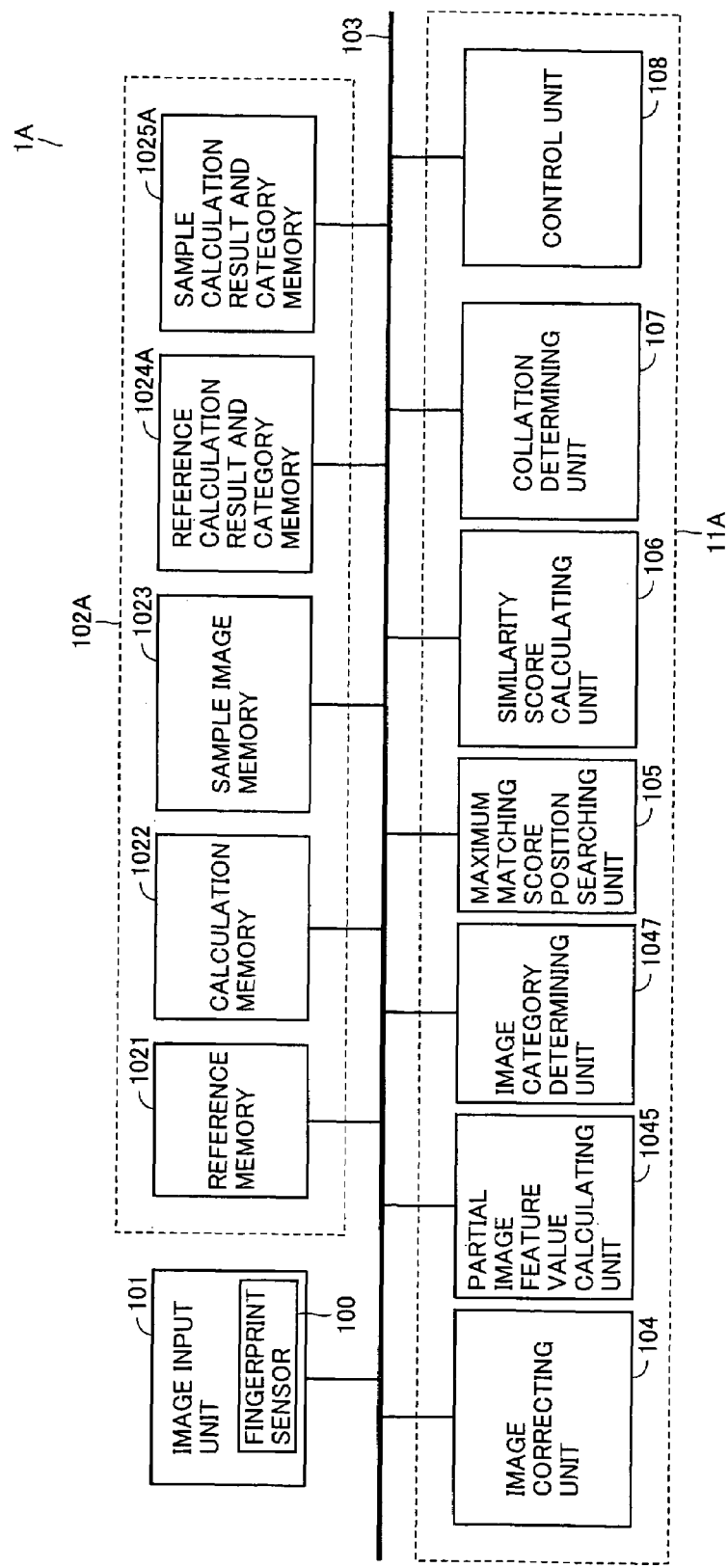
FIG. 12 shows a configuration of an image collating apparatus in accordance with Embodiment 2 of the present invention.

FIG. 12 shows a configuration of an image collating apparatus 1A in accordance with Embodiment 2. Image collating apparatus 1A of FIG. 12 differs from image collating apparatus 1 of FIG. 1 in that collating unit 1A has, in addition to the configuration of collating unit 1 shown in FIG. 1, an image category determining unit 1047, and that memory 102A has, in place of partial image feature value calculation result memory 1024 for the reference image and a partial image feature value calculation result memory 1025 for the sample image, a memory 1024A for storing partial image feature value calculation result and image category calculation result for the reference image (hereinafter simply, referred to as memory 1024A) and memory 1025A for storing partial image feature value calculation result and image category calculation result for the sample image (hereinafter simply referred to as memory 1025A). Other portions of memory 102A are the same as those of memory 102 shown in FIG. 1. Functions of partial image feature value calculating unit 1045, image category determining unit 1047 and maximum matching score position searching unit 105 are as will be described in the following, while the functions of other portions of collating unit 11A are the same as those of collating unit 11.

Partial image feature value calculating unit 1045 calculates, for each of a plurality of partial area images set in an image, a value corresponding to the pattern of the partial image, and outputs to memory 1024 the result of calculation related to the reference memory as partial image feature value and outputs to memory 1025A the result of calculation related to the sample image memory, as partial image feature value.

Image category determining unit 1047 performs the following process beforehand. Specifically, it performs a calculation to classify a plurality of reference images into categories. At this time, the images are classified into categories based on a combination of feature values of partial images at specific portions of respective reference images, and the result of classification is registered, together with image information, in memory 1024A.

When an image to be collated is input, image category determining unit 1047 reads partial image feature values from memory 1025A, finds a combination of partial image feature values of partial images at specific positions, and determines to which category the combination of partial image feature values belongs. Information of determination result is output, which instructs that only the reference images belonging to the same category as determined should be searched by maximum matching score position searching unit 105, or instructs that maximum matching score position searching unit 105 should search reference images with the reference images belonging to the same category given highest priority.

Maximum matching score position searching unit 105 identifies the reference image as the object of collation, based on the determination information output from image category determining unit 1047. On each of the input sample image and the identified reference image, the template matching process is performed in the similar manner as described above, with the scope of searches limited in accordance with the partial image feature values calculated by partial image feature value calculating unit 1045.

Figure 13:
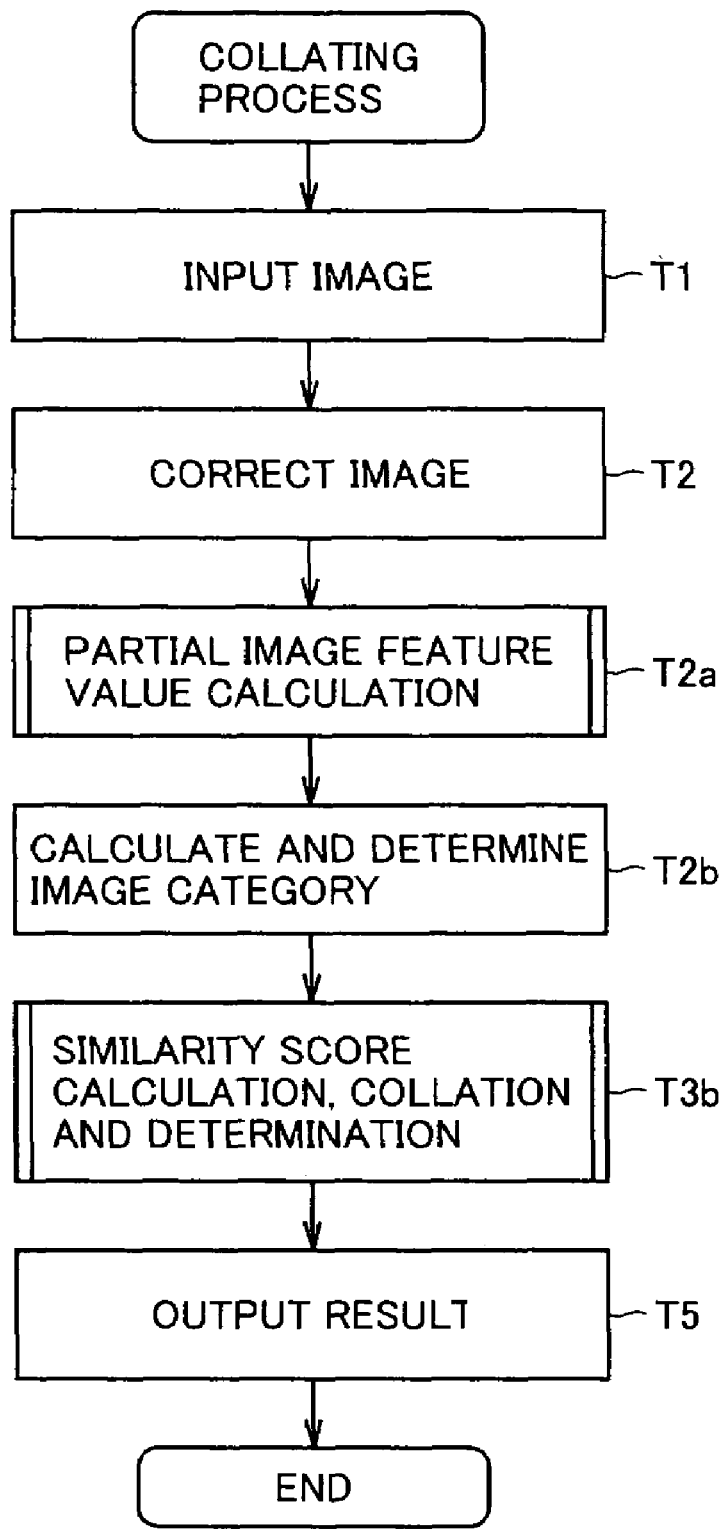
FIG. 13 is a flow chart of an image collating process in accordance with Embodiment 2 of the present invention.
Figure 14:
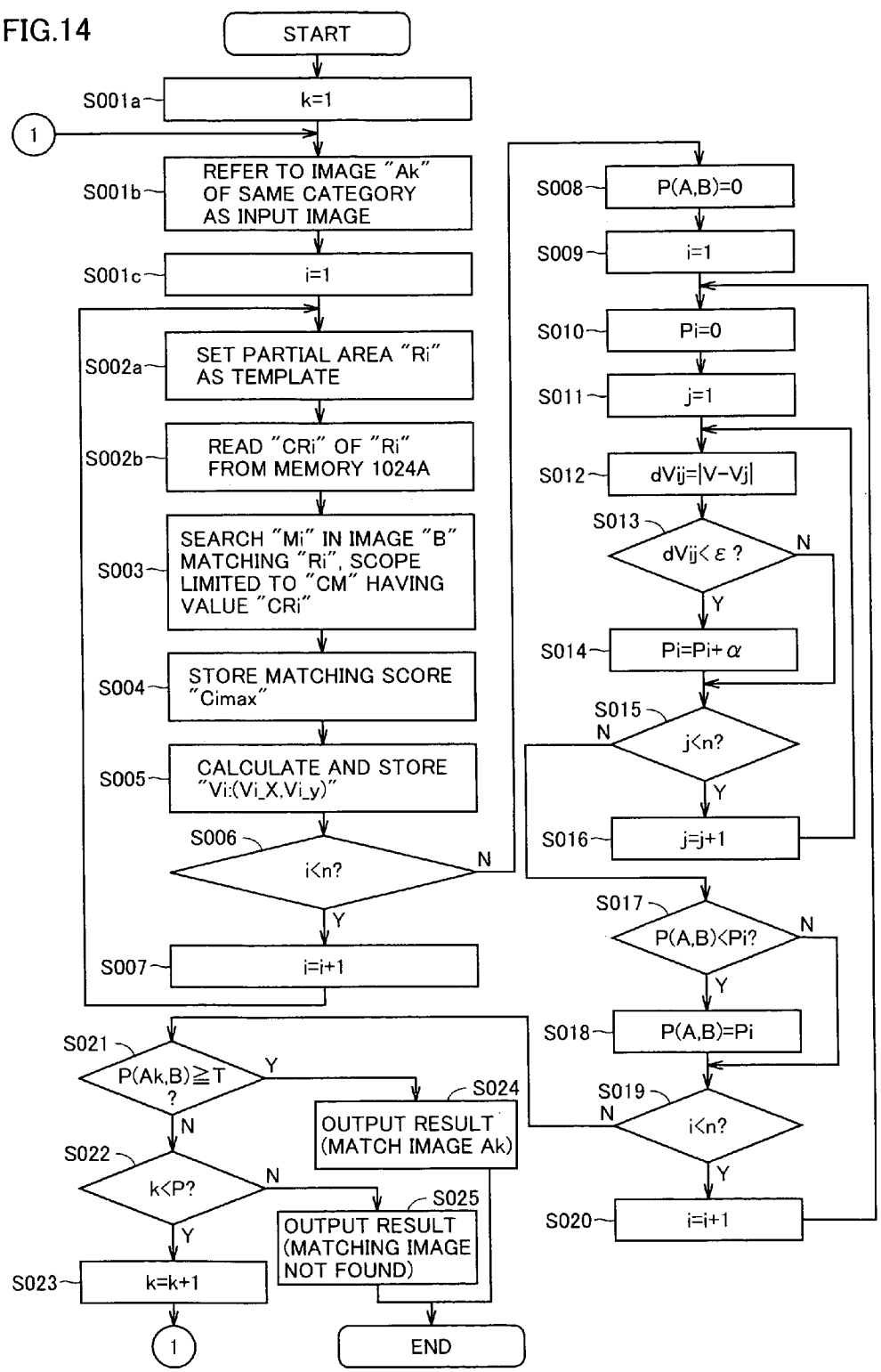
FIG. 14 is a flow chart of similarity score calculation, collation and determination processes in accordance with Embodiment 2 of the present invention.
Figure 15:
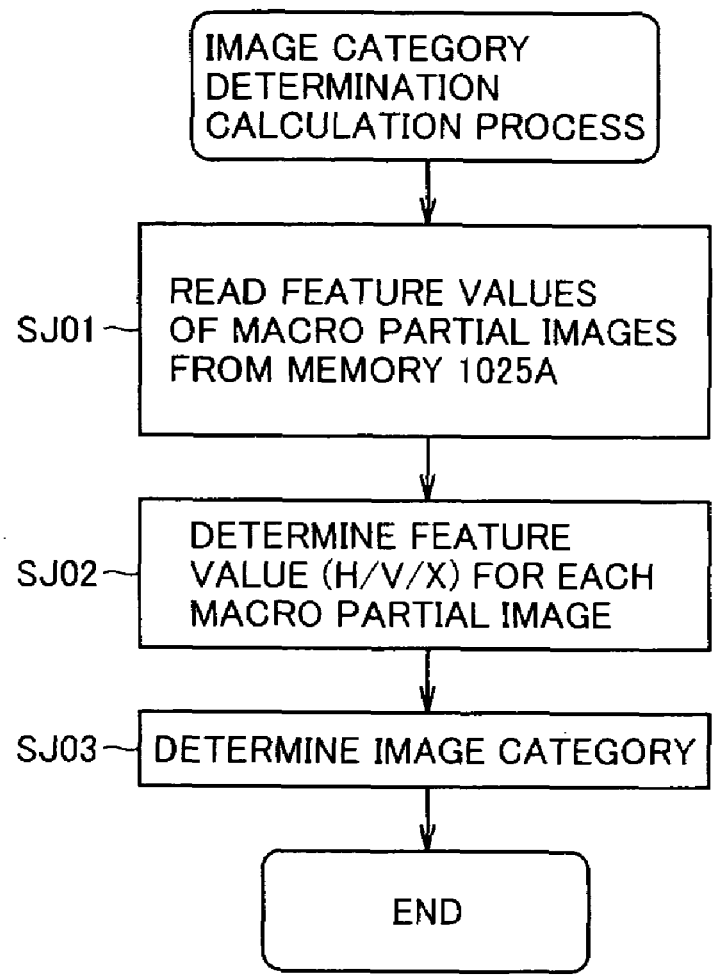
FIG. 15 is a flow chart of an image category determination calculation process in accordance with Embodiment 2 of the present invention.

FIG. 13 is a flow chart showing the procedure of collating process in accordance with Embodiment 2. Compared with the flow chart of FIG. 3, the flow of FIG. 13 is different in that in place of the processes for calculating similarity score (T3) and for collation and determination (T4), the processes for calculation to determine image category (T2b) and for calculating similarity score and collation/determination (T3b) are provided. Other process steps of FIG. 13 are the same as those of FIG. 3. FIG. 14 is a flow chart showing the process for calculating similarity score and for collation and determination (T3b), and FIG. 15 is a flow chart showing the process for calculation to determine image category (T2b).

In the image collating process, image correction is done on the sample image by image correcting unit 104 (T2) in the similar manner as in Embodiment 1, and thereafter, feature values of partial images are calculated for the sample image and the reference image by partial image feature value calculating unit 1045. The process for determining image category (T2b) is performed on the sample image and the reference image that have been subjected to such calculations, by category determining unit 1047. This process will be described in accordance with the flow chart of FIG. 15, referring also to FIGS. 16 to 19.

First, partial image feature value of each macro partial image is read from memory 1025A (step (hereinafter simply denoted by SJ) SJ01). Specific operations are as follows.

Assume that the images to be handled are fingerprint images. As is already known, fingerprint patterns can be classified, by way of example, into five categories such as shown in FIG. 16. In Table TB1 of FIG. 16, data 32 to 34 respectively representing arrangement of partial image group (macro partial image), image category name and category number are registered in correspondence with data 31 representing known image examples of fingerprints. Table TB1 is stored in advance in memory 624, and referred to as needed by image category determining unit 1047, for determining category. Data 32 is also shown in FIGS. 18D and 19D, which will be described later.

In table TB1, data 31 of fingerprint image examples are registered, which include whorl image data 31A, plain arch image data 31B, tented arch image data 31C, right loop image data 31D, left loop image data 31E and image data 31F that does not correspond to any of these types of data. When the characteristics of these data are utilized and the object of image collation could be limited to the category to which both the reference image and the sample image belong, the burden of collating process would significantly be reduced. If the feature values of partial images could be utilized for classifying categories, classification would be possible with smaller burden of processing.

Referring to FIGS. 17A to 17F, the contents registered in table TB1 of FIG. 16 will be described. FIGS. 17B and 17C schematically represent the input (taken) image and the reference image, respectively, which are divided into 8 along the vertical and horizontal directions. Namely, the images are each shown as consisting of 64 partial images. FIG. 17A defines, as FIG. 9A above, the positions "g1" to "g64" for each of the partial images of FIGS. 17B and 17C.

FIG. 17D defines macro partial images M1 to M9 in accordance with the present embodiment. In the present embodiment, the macro partial image represents a combination of a plurality of specific partial images represented by positions "g1" to "g64" of the sample image or the reference image. In the present embodiment, each of the macro partial images M1 to M9 consists of a combination of four partial images. It is assumed in the present embodiment that there are nine macro partial images M1 to M9 per one image. The number of macro partial images per one image is not limited to nine, and the number of partial images constituting one macro partial image is not limited to four, either. Partial images constituting macro partial images M1 to M9 specified by corresponding positions (g1 to g64) are as follows.

Macro partial image M1∋g4, g5, g12, g13
Macro partial image M2∋g25, g26, g33, g34
Macro partial image M3∋g27, g28, g35, g36
Macro partial image M4∋g28, g29, g36, g37
Macro partial image M5∋g29, g30, g37, g38
Macro partial image M6∋g31, g32, g39, g40
Macro partial image M7∋g49, g50, g57, g58
Macro partial image M8∋g52, g53, g60, g61
Macro partial image M9∋g55, g56, g63, g64

For each of the macro partial images M1 to M9, feature values of partial images thereof are read from memory 1025A (SJ01). Partial image feature values of images shown in FIGS. 17B and 17C are given in FIGS. 17E and 17F, respectively. FIG. 18A shows feature values of four partial images 1 to 4 read for respective ones of macro partial images M1 to M9 of the image corresponding to FIGS. 17B and 17E.

Thereafter, the feature value is identified to be "H", "V" or "X", for each macro partial image (SJ02). This process will be described.

In the present embodiment, when three or four partial images among the four partial images constituting each macro partial image all have the feature value "H", the feature value of the macro partial image is determined to be "H", when they all have the feature value "V", it is determined to be "V", and otherwise "X".

A specific example will be described. In the image shown in FIG. 17B, four partial images constituting macro partial image M1 have feature values "H", "H", "H" and "H", and there is no partial image that has the feature value "V" or "X" (see FIG. 18B). Therefore, macro partial image M1 is determined to have the feature value "H" (see FIG. 18C). Similarly, feature values of macro partial images M2 to M9 are determined to be "V", "X", "X", "X", "V", "X", "H" and "X", respectively (see FIG. 18C).

Thereafter, referring to the result of determination for each macro partial image, image category is determined (SJ03). The procedure of determination will be described. First, comparison with the arrangement of partial image groups having the fingerprint image features such as shown by image data 31A to 31F in FIG. 16 is performed. FIG. 18D shows feature values of macro partial images M1 to M9 of image data 31A to 31F, in correspondence to data 34 of category number.

When we compare FIGS. 18C and 18D, it can be understood that macro partial images M1 to M9 of image data 31A having the category number data 34 of "1" has the same feature values as macro partial images M1 to M9 of FIG. 18C. Therefore, it is determined that the image corresponding to FIG. 17B of the sample (input) image belongs to the category "1". In other words, the input image is determined to be a fingerprint image having a whorl pattern.

Similarly, the image corresponding to FIG. 17C is processed as shown in FIGS. 19A to 19E, and determined to belong to category "2". In other words, the image is determined to be a fingerprint image having a plain arch pattern.

Returning to FIG. 13, the process for calculating similarity score and collation determination (T3b) is performed, taking into consideration the result of image category determination described above. This process will be described with reference to the flow chart of FIG. 14.

Control unit 108 transmits a template matching start signal to maximum matching score position searching unit 105, and waits until a template matching end signal is received. Maximum matching score position searching unit 105 starts the template matching process represented by steps S001a to S001c, S002a to S002b and S003 to S007.

First, counter variable "k" (here, variable "k" represents the number of reference images that belong to the same category) is initialized to "1" (S001a). Next, a reference image "Ak" that belongs to the same category as the category of the input image indicated by the determination result output through the calculation for image category determination (T25b) is referred to (S001b). Thereafter, counter variable "i" is initialized to "1" (S001c). Then, the image of the partial area defined as partial image "Ri" from reference image "Ak" is set as a template to be used for the template matching (S002a, S002b). Thereafter, processes similar to those described with reference to FIG. 8 are performed on the reference image "Ak" and on the input image, in steps S003 to S020.

Thereafter, control unit 108 transmits a collation determination start signal to collation determining unit 107, and waits until a collation determination end signal is received. Collation determining unit 107 collates and determines. Specifically, the similarity score given as a value of a variable "P(Ak, B)" stored in memory 102 is compared with a predetermined collation threshold "T" (step S021). If the result of determination is "P(Ak, B)"≧"T", it is determined that the reference image "Ak" and the input image "B" are obtained from one same fingerprint, and a value indicating a match, for example, "1" is written as the result of collation to a prescribed address of memory 102 (S204). Otherwise, the images are determined to be obtained from different fingerprints, and if "k"<"p" ("p" represents the total number of reference images of the same category) (YES in S022), that is, if there is any reference image "Ak" not yet referred to in the same category, the variable "k" is incremented by "1" (S023), the flow returns to step S001b to perform similarity score calculation and collation again, using another reference image of the same category.

After the collating process using the said another reference image, the similarity score given by the value "P(Ak, B)" stored in memory 102 is compared with a predetermined collation threshold "T" and if the result is "P(Ak, B)"≧"T" (YES in step S021), it is determined that the images "Ak" and "B" are obtained from one same fingerprint, and a value indicating a match, for example, "1" is written as the result of collation to a prescribed address of memory 102 (S024), a collation determination end signal is transmitted to control unit 108, and the process ends. If the result of determination is not "P(Ak, B)"≧"T" (NO in step S021), and if "k"<"p" does not hold (No in S022), that is, if there is no reference image "Ak" not yet referred to in the same category, a value indicating a mismatch, for example, "0" is written as the result of collation to a prescribed address of memory 102 (S025). Thereafter, a collation determination end signal is transmitted to control unit 108, and the process ends. Thus, the similarity score calculation and collation determining process is completed.

Returning to FIG. 13, finally, the result of collation stored in memory 102 is output by control unit 108 to display 610 or to printer 690 (step T5), and the image collation ends.

In the present embodiment, part of or all of the image correcting unit 104, partial image feature value calculating unit 1045, image category determining unit 1047, maximum matching score position searching unit 105, similarity score calculating unit 106, collation determining unit 107 and control unit 108 may be implemented by an ROM such as memory 624 storing the process procedure as a program and a processor such as CPU 622.

A specific example of the collating process in accordance with Embodiment 2 and effects attained thereby will be described.

As described above, the collating process characteristic of the present embodiment is the calculating process for image category determination (T2b) and the similarity score calculation and collation determining process (T3b) of the flow chart shown in FIG. 13. Therefore, in the following, description will be given assuming that the images have been subjected to image input (T1), image correction (T2) and partial image feature value calculation process (T2a).

Here, it is assumed that 100 reference image data are registered in the image collating system, and that the patterns of the reference images, that is, the image categories of the present embodiment, do not have any specific tendency. With this assumption, it follows that each category of Embodiment 2 has 20 reference images.

In Embodiment 1, it is expected that "match" as a result of determination is obtained when an input image is collated with about 50 reference images as an average, that is, half the total number of 100 reference images. According to Embodiment 2, the reference images as the object of collation are limited to those belonging to one category, by the image category determining calculation (T2b), prior to the collation process. Therefore, in Embodiment 2, it is expected that "match" as a result of determination is obtained when an input image is collated with about 10 reference images, that is, half the total number of reference images in each category.

Therefore, the amount of processing for similarity score determination and collation determination of Embodiment 2/the amount of processing for similarity score determination and collation determination of Embodiment 1≈(1/number of categories). It is noted that amount of processing in Embodiment 2 additionally includes the calculation for image category determination (T2b) prior to the collating process. However, the feature values (FIGS. 18A and 19A) of the partial images belonging to respective macro partial images as the source information used for this calculation are also used in Embodiment 1, and therefore, the amount of processing is not increased in Embodiment 2 than in Embodiment 1.

The feature value determination on macro-image-by-macro-image basis (see FIGS. 18C and 19C) and image category determination (see FIGS. 18E and 19E) are each a comparing process with small amount of processing performed only once before the process of collation with a large number of reference images, as can be seen from the comparison between FIGS. 18D and 18E (or comparison between FIGS. 19D and 19E), and therefore, it is apparent that the amount of processing is practically negligible.

Though the reference images are described as stored in memory 1024 in advance in Embodiment 2, the reference images may be provided by using snap-shot images.

Embodiment 3

The partial image feature value may be calculated through the following procedure, different from Embodiment 1.

Figure 20:
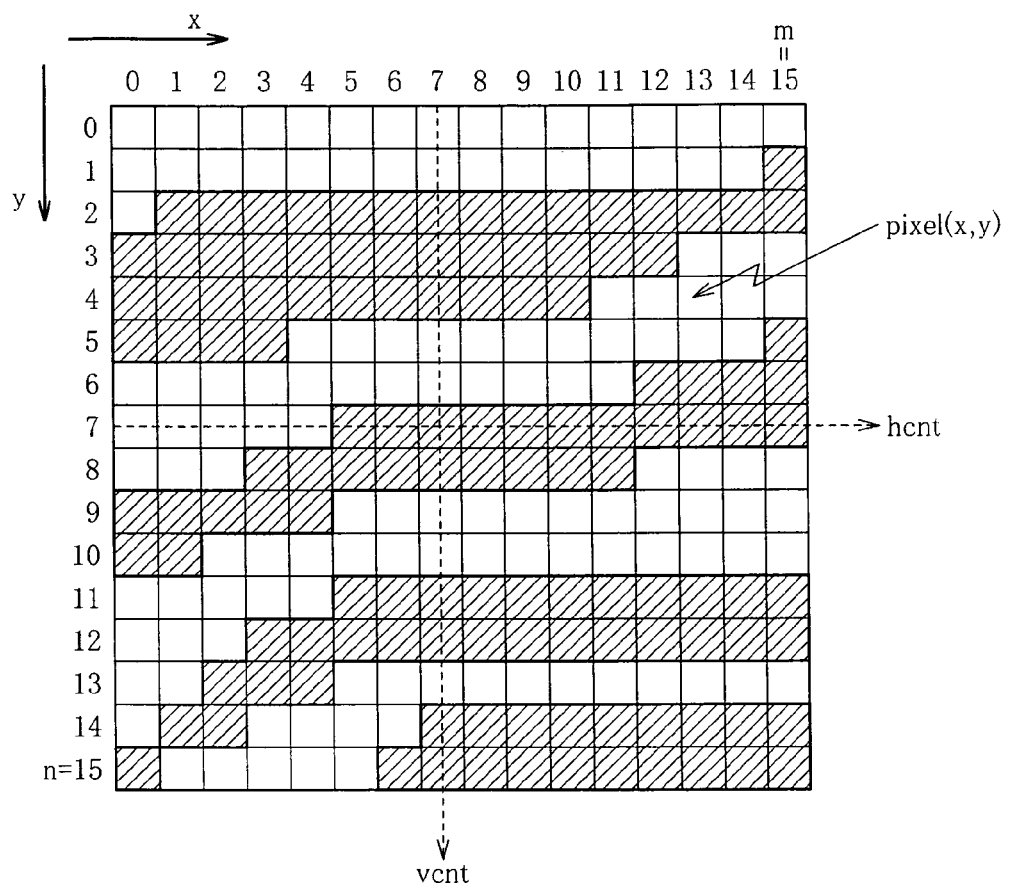
FIG. 20 schematically represents an image feature value calculating process in accordance with Embodiment 3 of the present invention.

Outline of the calculation of the partial image feature value in accordance with Embodiment 3 will be described with reference to FIG. 20. FIG. 20 shows, for partial images of an m×n image, the number of changes in pixel value of pixels (x, y) of representative pixel strings in horizontal and vertical directions, that is, the number of changes in pixel values of the pixel string of y=7 in the horizontal direction ("y" direction) and changes in pixel values of the pixel string of x=7 in the vertical direction ("x" direction). In this figure, the partial image consists of a partial area of 16 pixels×16 pixels, which has 16 pixels in the horizontal direction and 16 pixels in the vertical direction.

According to Embodiment 3, the partial image feature value is calculated in the following manner. The number of changes "hcnt" of pixel values along the horizontal direction and the number of changes "vcnt" of pixel values along the vertical direction are calculated, the number of changes "hcnt" of pixel values along the horizontal direction is compared with the number of changes "vcnt" of pixel values along the vertical direction, and if the direction having relatively larger number of changes of pixel values is the vertical direction, a value "H" indicating "horizontal" is output, if it is the horizontal direction, a value "V" indicating "vertical" is output, and otherwise, "X" is output.

Even if the value is determined to be "H" or "V" in the foregoing, "X" is output when the number of changes of pixel values is smaller than a lower limit "cnt0" set in advance for both directions for determining changes in pixel values. That the lower limit "cnt0" for determining changes in pixel values is small means the change in pattern of the partial image has small absolute value. In the extreme example in which cnt0=0, the partial area as a whole either has a value or not. In such a situation, practically, it is better not to make determination of horizontal or vertical. These conditions can be given by the following expressions. Namely, if hcnt<vcnt and max (hcnt, vcnt)≧cnt0, "H" is output; if hcnt>vcnt and max (hcnt, vcnt)≧cnt0, "V" is output; otherwise, "X" is output.

Figure 21:
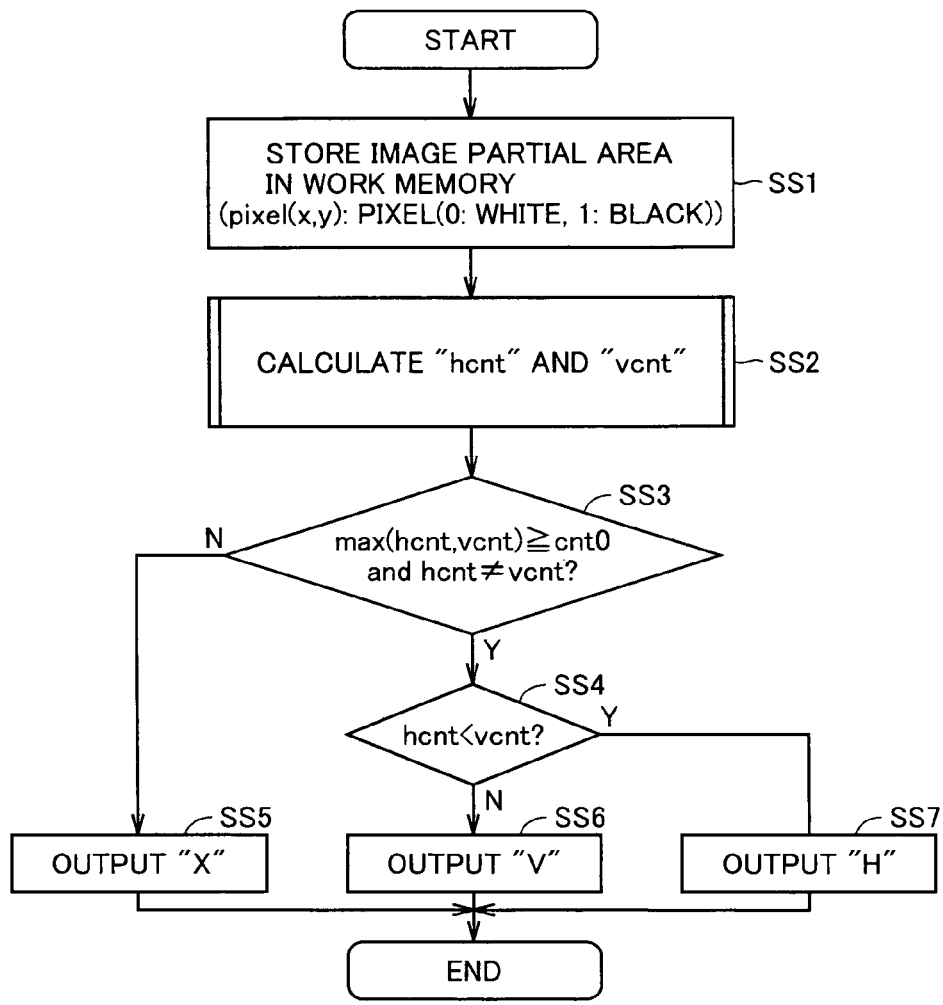
FIG. 21 is a flow chart of a partial image feature value calculating process in accordance with Embodiment 3 of the present invention.

FIG. 21. is a flow chart representing the process for calculating the partial image feature value in accordance with Example 3. The process of this flow chart is repeated on "n" partial images "Ri" of the reference images in reference memory 1021 as the object of calculation, and the calculation result values are stored in partial image feature value calculation result memory 1024 for the reference image in correspondence with respective partial images "Ri". Similarly, the process of this flow chart is repeated on "n" partial images "Ri" of the sample images in sample image memory 1023, and the calculation result values are stored in partial image feature value calculation result memory 1025 for the sample image, in correspondence with respective partial images "Ri". In the following, details of the process for calculating the partial image feature value will be described with reference to the flow chart of FIG. 21.

Control unit 108 transmits a partial image feature value calculation start signal to partial image feature value calculating unit 1045, and thereafter, waits until a partial image feature value calculation end signal is received. Partial image feature value calculating unit 1045 reads the partial image "Ri" as the object of calculation from reference memory 1021 or from sample image memory 1023, and stores the same temporarily in calculation memory 1022 (step SS1).

Partial image feature value calculating unit 1045 reads the stored partial image "Ri", and calculates the number of changes of pixel values "hcnt" in the horizontal direction and the number of changes of pixel values "vcnt" in the vertical direction (step SS2). Here, the process for calculating the number of changes of pixel values "hcnt" in the horizontal direction and the number of changes of pixel values "vcnt" in the vertical direction will be described with reference to FIGS. 22 and 23.

Figure 22:
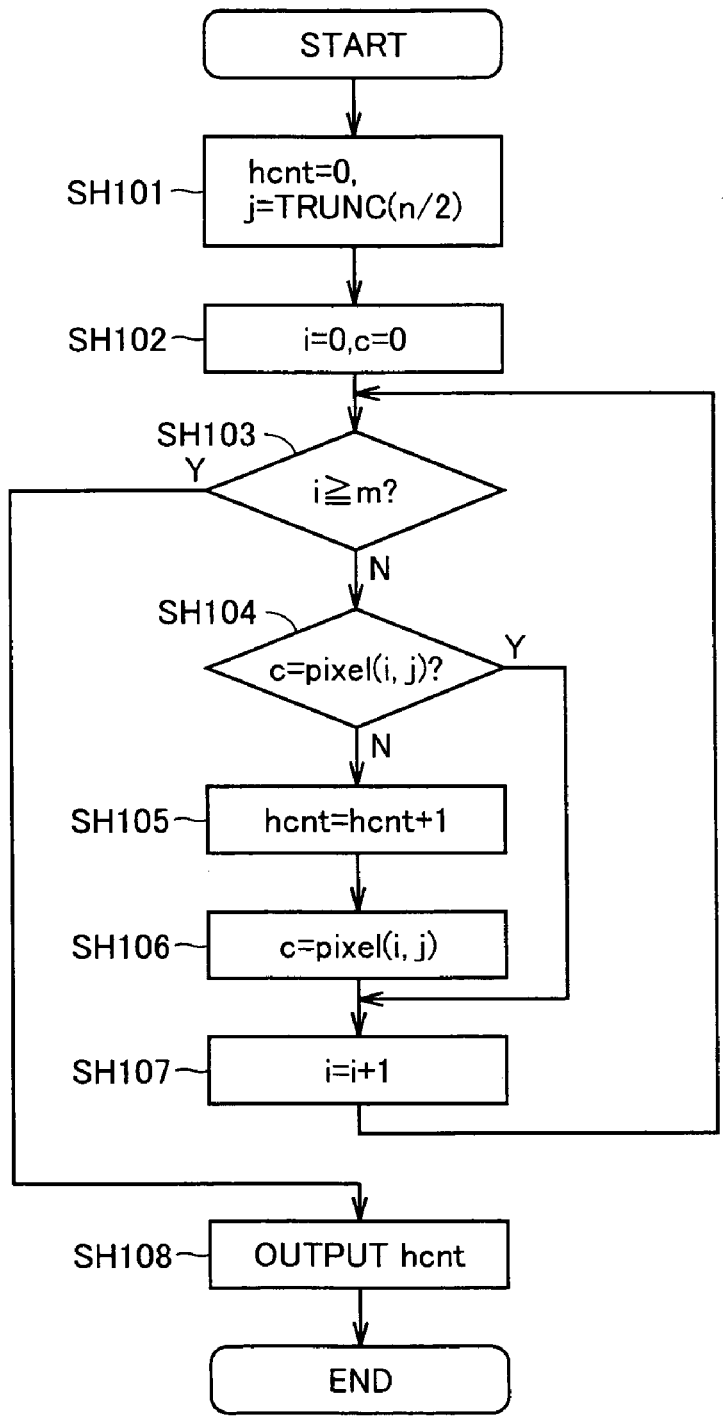
FIG. 22 is a flow chart of a process for calculating number of changes in pixel value along the horizontal direction in the partial image, in accordance with Embodiment 3 of the present invention.

FIG. 22 is a flow chart representing the process for calculating the number of changes of pixel values "hcnt" in the horizontal direction (step SS2) in the process for calculating partial image feature value (step T2a) in accordance with Embodiment 2 of the present invention. Referring to FIG. 22, partial image feature value calculating unit 1045 reads the partial image "Ri" from calculation memory 1022, initializes the number of changes of pixel values "hcnt" in the horizontal direction to hcnt=0, and sets the coordinate "j" of the string of pixels representing the horizontal direction, to half the maximum coordinate value "n" on the "y" axis truncated after the decimal point, to j=TRUNC(n/2). Specifically, the value is TRUNC(15/2)=7 (step SH101).

Thereafter, the parameter "i" representing a coordinate value along the "x" axis and the parameter "c" representing the pixel value are initialized to i=0 and c=0 (step SH102).

Then, the parameter "i" representing a coordinate value along the "x" axis is compared with the maximum coordinate value "m" along the "x" axis (step SH103), and if i≧m, step SH108 is executed, and otherwise, step SH104 is executed. In Embodiment 3, m=15, and i=0 at the start of processing, and therefore, the flow proceeds to step SH104.

Next, pixel (i, j) is compared with the parameter "c" representing the pixel value. If c=pixel (i, j), step SH107 is executed, and otherwise, step SH105 is executed. At present i=0 and j=7, and the coordinate pixel (0, 7)=0, that is, equal to c. Thus, the flow proceeds to step SH107.

In step SH107, coordinate value of parameter "i" representing a coordinate value along the "x" axis is incremented by "1", and the flow proceeds to step SH103. Thereafter, the same process is repeatedly performed while i=1 to 4, and the flow again proceeds to step SH103 with i=5. In this state, i≧m holds, and therefore, the flow proceeds to step SH104.

In step SH104, pixel (i, j) is compared with the parameter "c" representing the pixel value, and if c=pixel (i, j), step SH107 is executed, and otherwise, step SH105 is executed next. At present, i=5, j=7 and c=0, and pixel (5, 7)=1 at the coordinates as can be seen from FIG. 20. Next, the flow proceeds to step SH105.

Next, as the pixel value in the horizontal direction has changed, "hcnt" is incremented by "1" in step SH105 and, in order to further detect the change in the pixel value, the present pixel value pixel (5, 7)=1 is input to parameter "c" representing the pixel value (step SH106).

Next, in step SH107, coordinate value of parameter "i" representing a coordinate value along the "x" axis is incremented by "1", and the flow proceeds to step SH103 with i=6.

Thereafter, while i=6 to 15, process steps SH103→SH104→SH107 are performed in the similar manner, and when i attains to i=16, i≧m is satisfied in step SH103, so that the flow proceeds to step SH108 and hcnt=1 is output.

Figure 23:
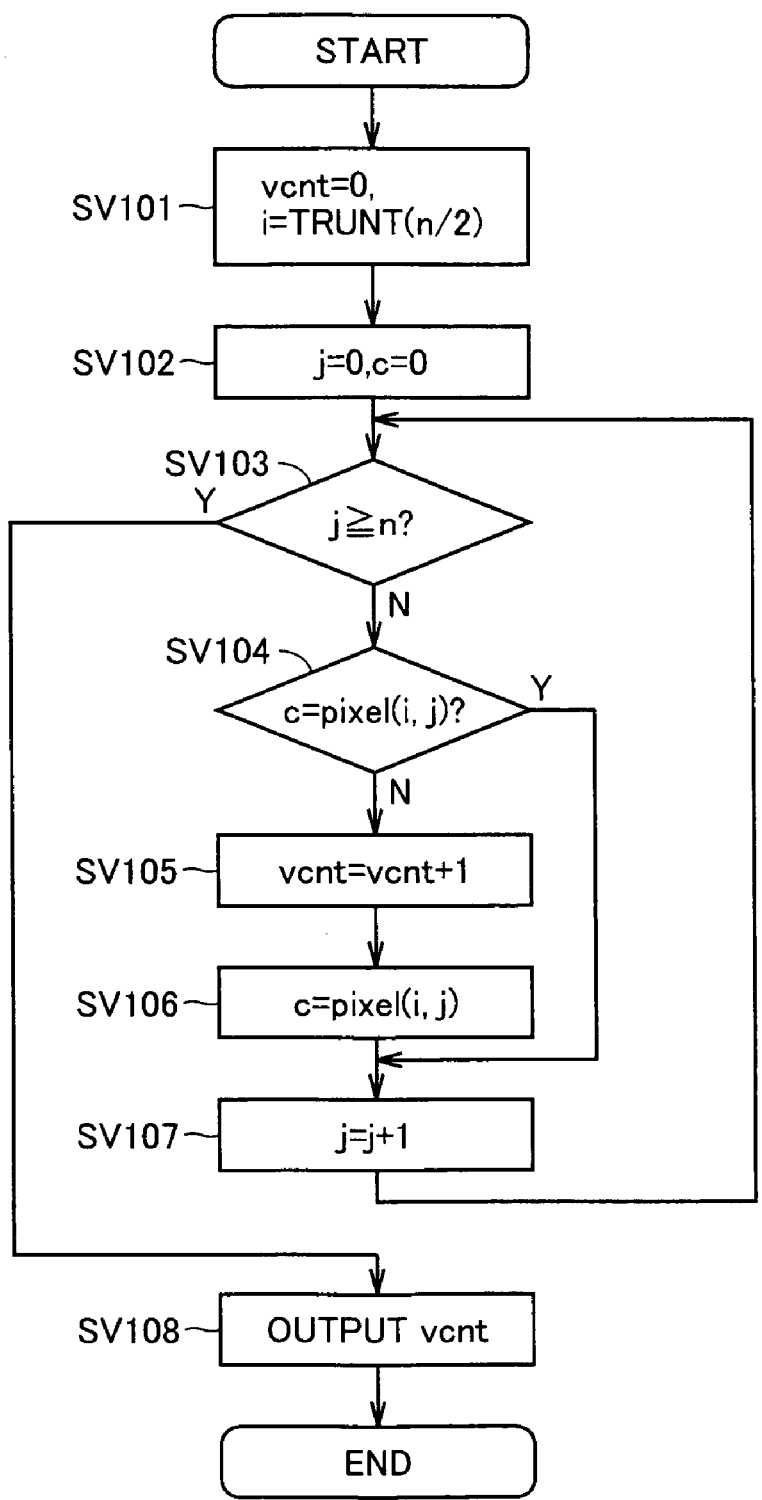
FIG. 23 is a flow chart of a process for calculating number of changes in pixel value along the vertical direction in the partial image, in accordance with Embodiment 3 of the present invention.

FIG. 23 is a flow chart representing the process for calculating the number of changes of pixel values "vcnt" in the vertical direction (step SS2) in the process for calculating partial image feature value (step T2a) in accordance with Embodiment 2 of the present invention. Here, in steps SV101 to SV108, basically the same processes as those shown in the flow chart of FIG. 22 are performed, and therefore, detailed description will not be repeated.

The output number of changes of pixel values "hcnt" in the horizontal direction and the number of changes of pixel values "vcnt" in the vertical direction are hcnt=1 and vcnt=32, as can be seen from FIG. 20. The processes performed on the thus output values "hcnt" and "vcnt" will be described in the following, returning to step SS3 and the following steps of FIG. 21.

In step SS3, from "hcnt", "vcnt" and "cnt0", whether the condition max (hcnt, vcnt)≧cnt0 and hcnt≠vcnt is satisfied or not is determined. At present hcnt=1 and vcnt=32, and if cnt0 is set to 2, the flow proceeds to step SS4. In step SS4, the condition hcnt<vcnt is satisfied, and therefore, the flow proceeds to step SS7, in which "H" is output to the feature value storage area of partial image "Ri" of the original image in partial image feature value calculation result memory 1024 for the reference image, or in a partial image feature value calculation result memory 1025 for the sample image, and the partial image feature value calculation end signal is transmitted to control unit 108.

If the output values of step SS2 are hcnt=32, vcnt=1 and cnt0=2, the condition of step SS3 is satisfied and the condition of step SS4 is not satisfied, and therefore, the flow proceeds to step SS6, in which "V" is output to the feature value storage area of partial image "Ri" of the original image in partial image feature value calculation result memory 1024 for the reference image, or in a partial image feature value calculation result memory 1025 for the sample image, and the partial image feature value calculation end signal is transmitted to control unit 108.

If the output values of step SS2 are, by way of example, hcnt=32, vcnt=7 and cnt0=2, or hcnt=2, vcnt=1 and cnt0=5, the condition of step SS3 is not satisfied, so that the flow proceeds to step SS5, in which "X" is output to the feature value storage area of partial image "Ri" of the original image in partial image feature value calculation result memory 1024 for the reference image, or in a partial image feature value calculation result memory 1025 for the sample image, and the partial image feature value calculation end signal is transmitted to control unit 108.

As described above, partial image feature value calculating unit 1045 in accordance with Embodiment 2 extracts (specifies) representative strings of pixels in the horizontal and vertical directions (pixel strings denoted by dotted arrows in FIG. 20) of the partial image "Ri" of the image as an object of calculation, based on the number of changes (1→0 or 0→1) of pixel values in each of the extracted pixel strings, determines whether the pattern of the partial image has a tendency to extend along the horizontal direction (tendency to be horizontal stripe), along the vertical direction (tendency to be vertical stripe) or no such tendency, and outputs a value reflecting the result of determination (any of "H", "V" and "X"). The output value represents the feature value of the corresponding partial image.

Embodiment 4

The procedure for calculating the partial image feature value is not limited to those described in Embodiments 1 and 2, and the procedure of Embodiment 4 as will be described in the following may be employed.

Outline of the partial image feature value calculation in accordance with Embodiment 4 will be described with reference to FIGS. 24A to 24F. FIGS. 24A to 24F represent partial image "Ri" with indication of total numbers of black pixels and white pixels. In these figures, partial image "Ri" consists of partial areas of 16 pixels×16 pixels, having 16 pixels both in the horizontal and vertical directions. In the calculation of partial image feature value in accordance with Embodiment 4, the partial image "Ri" as the object of calculation is displaced by 1 pixel in the left and right directions and the resulting images are superposed, and the number of increased black pixels "hcnt" (cross-hatched portion in image "WHi" of FIG. 24B) at this time is calculated, and the partial image as the object of calculation is displaced by 1 pixel in the upward and downward directions and the resulting images are superposed, and the number of increased black pixels "vcnt" (cross-hatched portion in image "WVi" of FIG. 24C) at this time is calculated. The calculated number of increased black pixels "hcnt" when moved in the left and right directions and the calculated number of increased black pixels "vcnt" when moved in the upward and downward directions are compared with each other, and if the increased amount when moved in the upward and downward directions is larger than double the increased amount when moved in the left and right directions, the value "H" representing "horizontal" is output, if the increased amount when moved in the left and right directions is larger than double the increased amount when moved in the upward and downward directions, the value "V" representing "vertical" is output, and otherwise, "X" is output. It is noted, however, that even if the determination of "H" or "V" is made, "X" is output unless the amount of increase of black pixels is equal to or larger than the lower limit value vcnt0 or hcnt0 set for respective directions beforehand. These conditions can be given by the following expressions. (1) If vcnt>2×hcnt and (2) vcnt≧vcnt0, then "H" is output. If (3) hcnt>2×vcnt and (4) hcnt≧hcnt0, then "V" is output, and otherwise, "X" is output.

In Embodiment 4, the value "H" representing "horizontal" is output when the amount of increase attained by displacement in upward and downward direction is larger than double the amount of increase attained by displacement in left and right directions. The condition of "double" may be changed to other value. The same applies to the left and right directions. If it is known in advance that the number of black pixels in the partial area is in a certain range (by way of example, 30 to 70% of the total number of pixels in partial image Ri) and the image is suitable for collating process, the conditions (2) and (4) may be omitted.

Figure 25A:
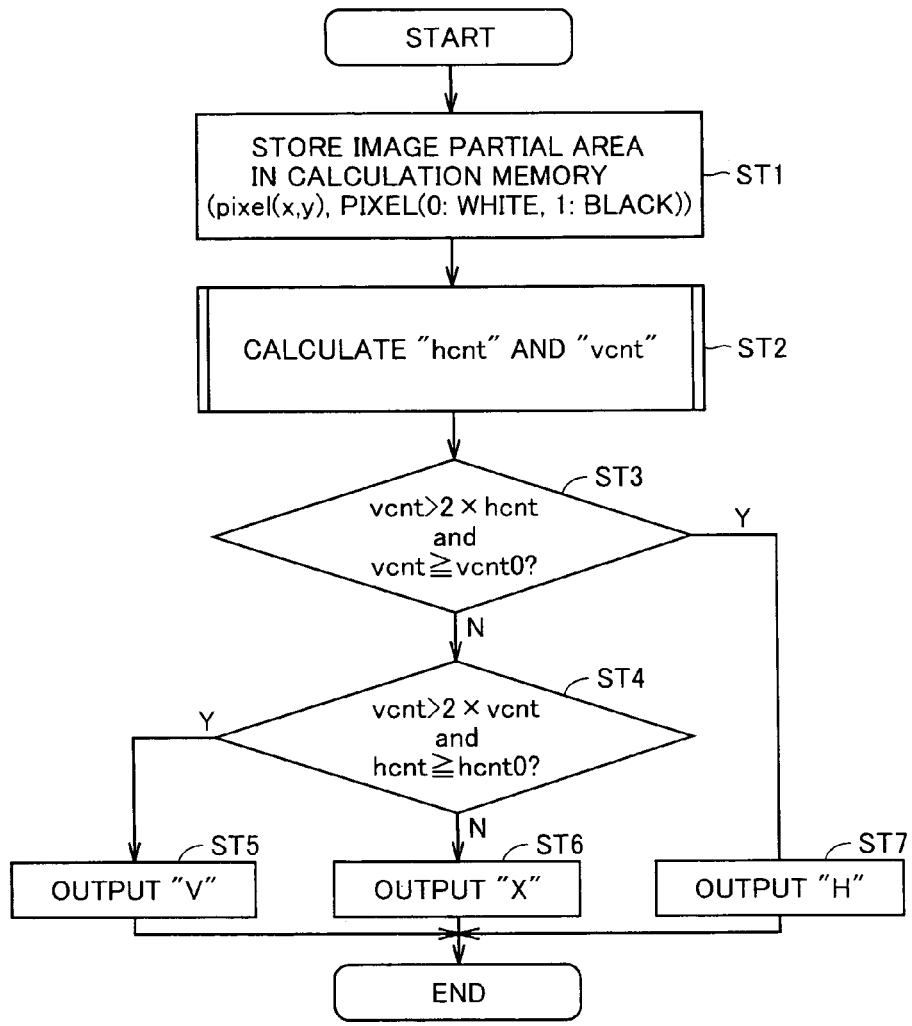
FIGS. 25A to 25C are flow chart and partial images to be referred to in the image feature value calculating process in accordance with Embodiment 4 of the present invention.
Figure 25B:
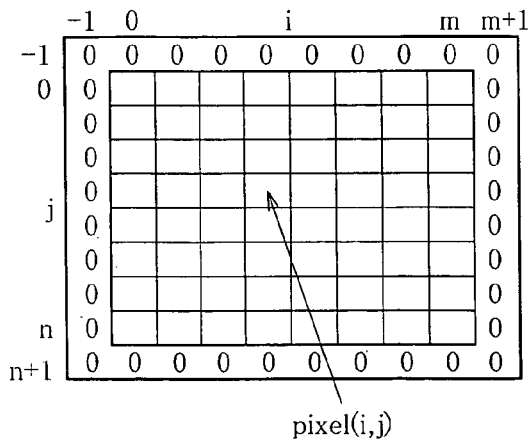

FIG. 25A is a flow chart of the process for calculating partial image feature value in accordance with Embodiment 4. The process of this flow chart is repeated on each of n partial images "Ri" of the reference image in reference memory 1021 as the object of calculation, and the calculation result values are stored in partial image feature value calculation result memory 1024 for the reference image in correspondence with respective partial images "Ri". Similarly, the process is repeated on each of n partial images "Ri" of the sample image in sample image memory 1023, and the calculation result values are stored in partial image feature value calculation result memory 1025 for the sample image in correspondence with respective partial images "Ri". Details of the process for calculating partial image feature value will be described with reference to the flow chart of FIG. 25A.

Control unit 108 transmits the partial image feature value calculation start signal to partial image feature value calculating unit 1045, and thereafter waits until the partial image feature value calculation end signal is received.

Partial image feature value calculating unit 1045 reads the partial image "Ri" (see FIG. 24A) as the object of calculation from reference memory 1021 or from sample image memory 1023, and temporarily stores the same in calculation memory 1022 (step ST1). Partial image feature value calculating unit 1045 reads the stored data of partial image "Ri", and calculates the amount of increase "hcnt" when moved in the left and right directions as shown in FIG. 24B and the amount of increase "vcnt" when moved in the upward and downward directions as shown in FIG. 24C (step ST2).

Figure 26:
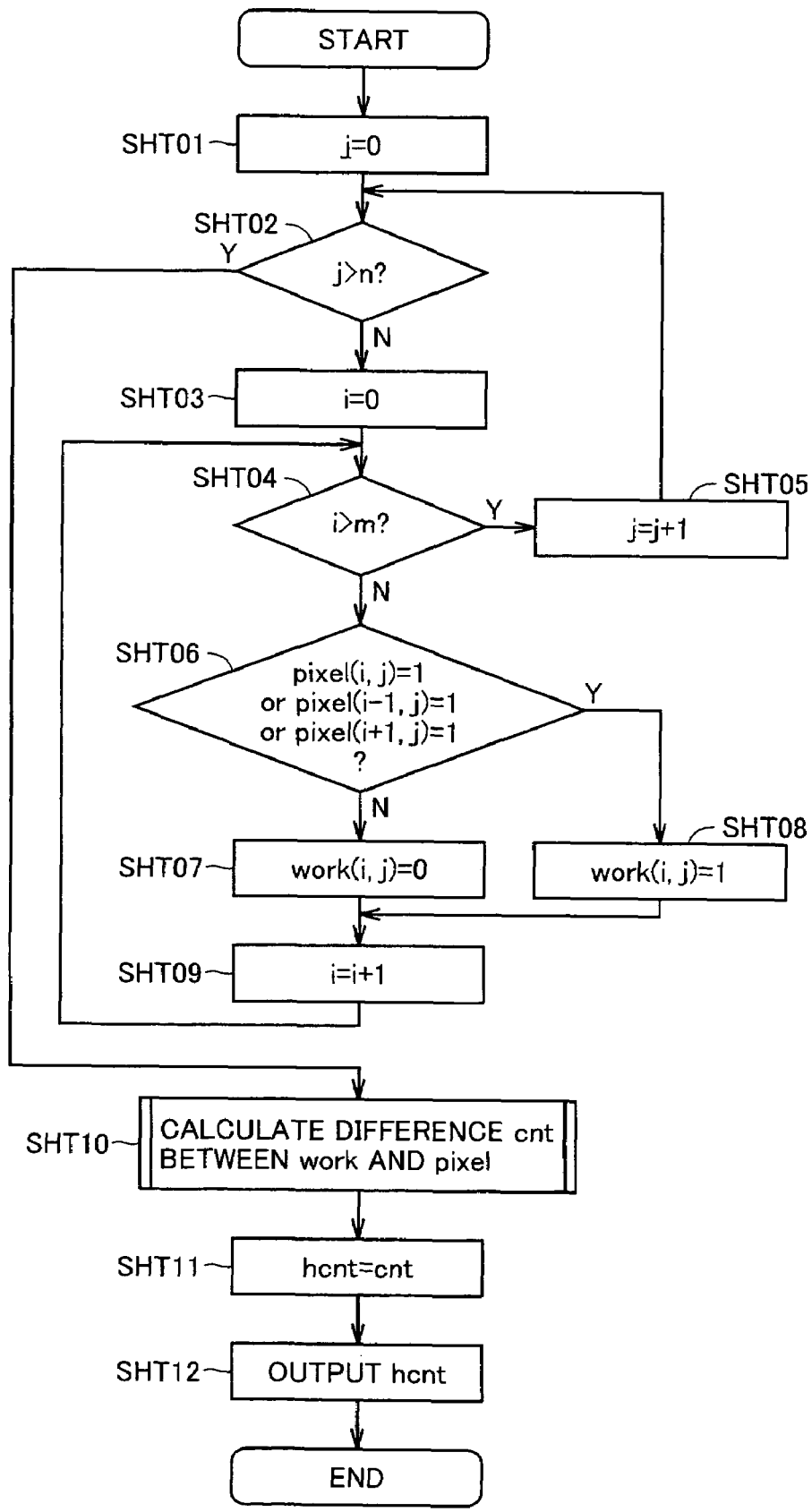
FIG. 26 is a flow chart of a process for calculating an amount of increase when the partial image is displaced to the left and right, in accordance with Embodiment 4 of the present invention.

The process for calculating the amount of increase "hcnt" when moved in the left and right directions and the amount of increase "vcnt" when moved in the upward and downward direction will be described with reference to FIGS. 26 and 27. FIG. 26 is a flow chart representing the process (step ST2) for calculating the amount of increase "hcnt" when moved in the left and right direction in the process (step T2a) for calculating partial image feature value in accordance with Embodiment 4.

Referring to FIG. 26, partial image feature value calculating unit 1045 reads the partial image "Ri" from calculation memory 1022, and initializes the a pixel counter "j" for the vertical direction to j=0 (step SHT01). Thereafter, the value of pixel counter "j" for the vertical direction is compared with the maximum pixel number "n" in the vertical direction (step SHT02), and if j>n, step SHT10 is executed next, and otherwise, step SHT03 is executed next. In Embodiment 4, n=15 and j=0 at the start of processing, and therefore, the flow proceeds to step SHT03.

In step SHT03, a pixel counter "i" for the horizontal direction is initialized to i=0 (step SHT03). Thereafter, the value "i" of the pixel counter for the horizontal direction is compared with the maximum number of pixels "m" in the horizontal direction (step SHT04), and if i>m, step STH05 is executed next, and otherwise, step SHT06 is executed. In Embodiment 4, m=15, and i=0 at the start of processing, and therefore, the flow proceeds to SHT06.

In step SHT06, whether the pixel value pixel (i, j) of the coordinates (i, j) that is the object of comparison at present is 1 (black pixel) or not, whether the pixel value pixel (i−1, j) of the coordinates (i−1, j) that is one unit to the left of coordinates (i, j) is 1 or not, or whether the pixel value pixel (i+1, j) of the coordinates (i+1, j) that is one unit to the right of coordinates (i, j) is 1 or not is determined. If pixel (i, 1)=1, pixel (i−1, j)=1 or pixel (i+1, j)=1, then step SHT08 is executed, and otherwise, step SHT07 is executed.

Here, it is assumed that pixel values in the scope of one pixel above, one pixel below, one pixel to the left and one pixel to the right of partial image "Ri", that is, the range of Ri(−1~m+1, −1), Ri(−1, −1~n+1), Ri(m+1, −1~n+1) and Ri(−1~m+1, n+1) are all "0" (white pixel). In Embodiment 4, pixel (0,0)=0, pixel (−1, 0)=0 and pixel (1, 0)=0, and therefore, the flow proceeds to step SHT07.

Figure 25C:
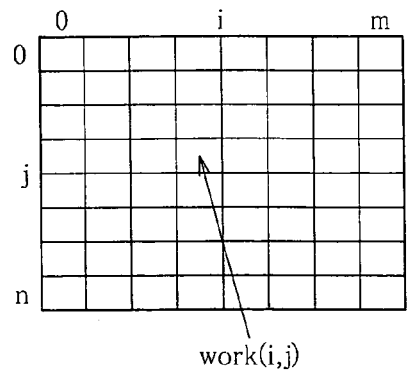

In step SHT07, "0" is stored as the pixel value work (i, j) (see FIG. 25C) of the coordinate (i, j) of image WHi obtained by displacement by 1 pixel in the left and night directions and superposing, which is stored in calculation memory 1022. Specifically, work (0, 0)=0. Then, the flow proceeds to step SHT09.

In step SHT09, the value "i" of pixel counter for the horizontal direction is incremented by 1, that is, i=i+1. In Embodiment 4, the value has been initialized to i=0, and by the addition of 1, the value attains to i=1. Then, the flow returns to step SHT04. As the pixel values of the 0-th row, that is, pixel (i, 0) are all white and 0, steps SHT04 to SHT09 are repeated until the value i attains to i=15, and at the end of step SHT09, the value i attains to i=15. In this state, the flow proceeds to step SHT04, and as m=15 and i=15, the flow proceeds to step SHT05.

In step SHT05, the value "j" of pixel counter for the vertical direction is incremented by 1, that is, j=j+1. At present, j=0, and therefore, the value j attains to j=1, and the flow returns to step SHT02. Here, it is the start of a new row, and therefore, as in the 0-th row, the flow proceeds to steps SHT03 and SHT04. Thereafter, steps SHT04 to SHT09 are repeated until the pixel of the first row and 14-th column, that is, i=14, j=1 having the pixel value of pixel (i+1, j)=1 is reached, and after the process of step SHT09, the value i attains to i=14. Here, m=15 and i=14, and the flow proceeds to SHT06.

In step SHT06, pixel (i+1, j)=1, namely, pixel (14+1, 1)=1, and therefore, the flow proceeds to step SHT08.

In step SHT08, "1" is stored as the pixel value work (i, j) (see FIG. 24B) of the coordinates (i, j) of image WHi obtained by displacement by 1 pixel in the left and right directions and superposing, which is stored in calculation memory 1022. Specifically, work (14, 1)=1.

Next, the flow proceeds to step STH09, in which i=15, so that the flow proceeds to step SHT04. Here, m=15 and i=15, and therefore the flow proceeds to step SHT05, in which j attains to j=2. Thus, the flow proceeds to step SHT02. Thereafter, the process of steps SHT02 to SHT09 is repeated while j=2 to 15, and when the value j attains to j=15 at the end of step SHT09, the flow proceeds to step SHT02, in which the value j of pixel counter for the vertical direction is compared with the maximum pixel number n in the vertical direction. If j>n, step SHT10 is executed next, and otherwise, step SHT03 is executed. Here, j=15 and n=15, so that the flow proceeds to step SHT10. At this time point, the image WHi such as shown in FIG. 24B, obtained by displacing the partial image "Ri" as the present object of comparison and collation by one pixel in left and right directions and superposing the resulting images, is stored in calculation memory 1022.

In step SHT10, a difference "cnt" between the pixel value work (i, j) of the image "WHi" obtained by displacement by one pixel in left and right directions and superposing, stored in calculation memory 1022 and the pixel value pixel (i, j) of the partial image "Ri", which is being compared and collated, is calculated. The process for calculating the difference "cnt" between "work" and "pixel" will be described with reference to FIG. 27.

Figure 27:
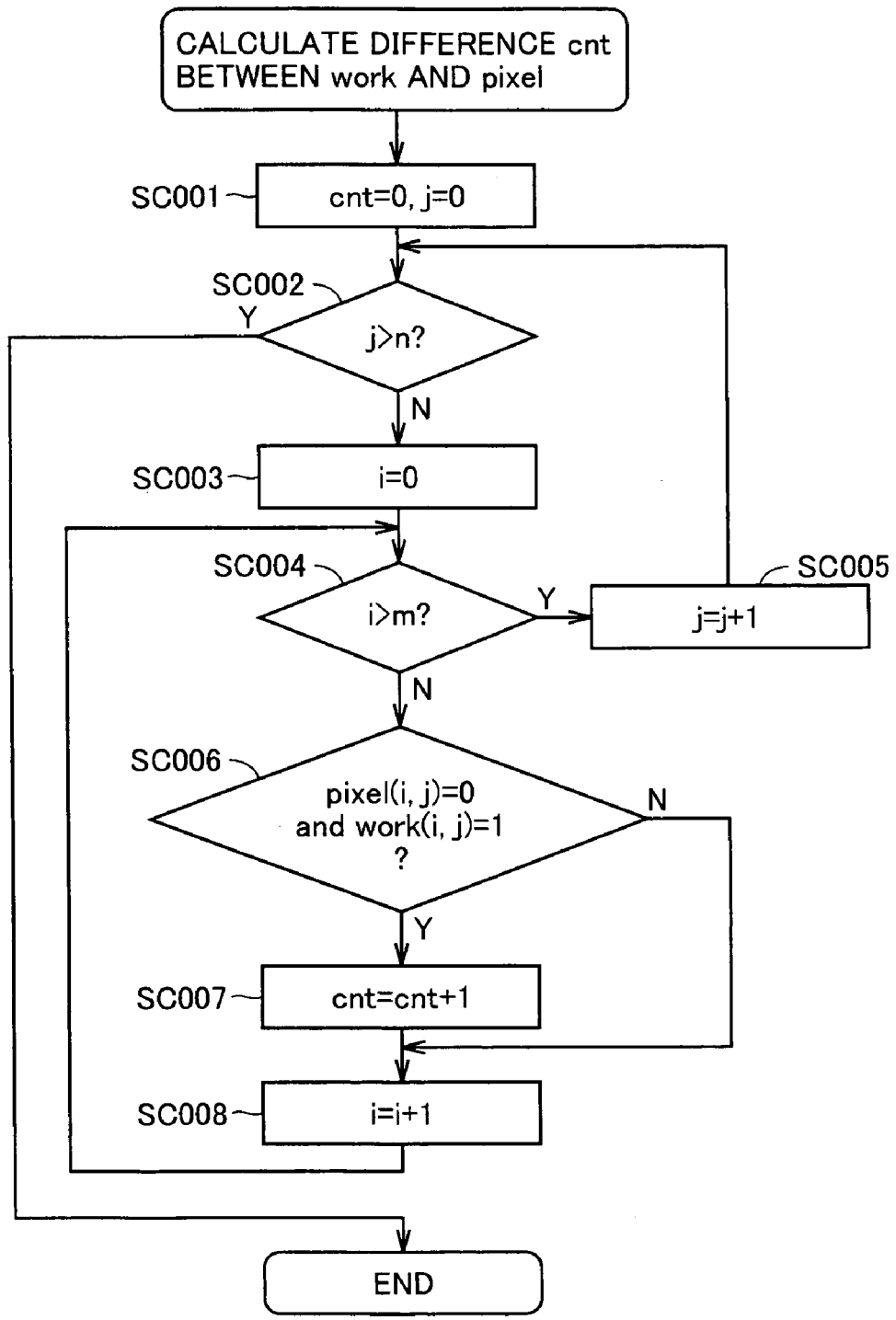
FIG. 27 is a flow chart of a process for calculating a difference in pixel value between an original partial image and images obtained by displacing the original partial image upward and downward and to the left and right, in accordance with Embodiment 4 of the present invention.

FIG. 27 is a flow chart representing the calculation of the difference "cnt" between the pixel value pixel (i, j) of the partial image "Ri" that is the object of comparison and collation at present and the pixel value work (i, j) of the image "WHi" obtained by displacing the partial image "Ri" by one pixel in left and right or upward and downward directions and superposing. Partial image feature value calculating unit 1045 reads the partial image "Ri" and the image "WHi" obtained by displacement of one pixel and superposition from calculation memory 1022, and initializes a difference counter "cnt" and pixel counter "j" for the vertical direction, that is, cnt=0 and j=0 (step SC001). Thereafter, the value "j" of pixel counter for the vertical direction is compared with the maximum number of pixels along the vertical direction (step SC002). If j>n, the flow returns to the process shown in FIG. 26, step SHT11 is executed in which "cnt" is input to "hcnt", and otherwise, step SC003 is executed next.

In Embodiment 4, n=15, and at the start of processing, j=0. Therefore, the flow proceeds to step SC003. In step SC003, pixel counter "i" for the horizontal direction is initialized to i=0. Thereafter, the value "i" of the pixel counter for the horizontal direction is compared with the maximum number of pixels "m" in the horizontal direction (step SC004), and if i>m, step SC005 is executed next, and otherwise, step SC006 is executed. In Embodiment 4, m=15, and i=0 at the start of processing, and therefore, the flow proceeds to SC006.

In step SC006, whether the pixel value pixel (i, j) of the coordinates (i, j) of the partial image "Ri" that is the object of comparison at present is 0 (white pixel) and the pixel value work (i, j) of the image WHi obtained by displacement by one pixel and superposition is 1 (black pixel) or not is determined. IF pixel (i, j)=0 and work (i, j)=1, step SC007 is executed next, and otherwise, step SC008 is execute next. In Embodiment 4, pixel (0, 0)=0 and work (0, 0)=0, as shown in FIGS. 24A and 24B, and therefore, the flow proceeds to step SC008.

In step SC008, the value "i" of pixel counter for the horizontal direction is incremented by 1, that is, i=i+1. In Embodiment 4, the value has been initialized to i=0, and by the addition of 1, the value attains to i=1. Then, the flow returns to step SC004. As the pixel values of the 0-th row, that is, pixel (i, 0) and work (i, 0) are all white and 0 as shown in FIGS. 24A and 24B, steps SC004 to SC008 are repeated until the value i attains to i=15, and at the end of step SC008, the value i attains to cnt=0 and i=15. In this state, the flow proceeds to step SC004, and as m=15 and i=15, the flow proceeds to step SC005.

In step SC005, the value "j" of pixel counter for the vertical direction is incremented by 1, that is, j=j+1. At present, j=0, and therefore, the value j attains to j=1, and the flow returns to step SC002. Here, it is the start of a new row, and therefore, as in the 0-th row, the flow proceeds to steps SC003 and SC004. Thereafter, steps SC004 to SC008 are repeated until the pixel of the first row and 14-th column, that is, i=14, j=1 having the pixel value of pixel (i+1, j)=0 and work (i, j)=1 is reached, and after the process of step SC008, the value i attains to i=14. Here, m=15 and i=14, and the flow proceeds to SC006.

In step SC006, pixel (i, j)=0 and work (i, j)=1, that is, pixel (14, 1)=0 and work (14, 1)=1, so that the flow proceeds to step SC007.

In step SC007, the value "cnt" of the difference counter is incremented by 1, that is, cnt=cnt+1. In Embodiment 4, the value has been initialized to cnt=0, and by the addition of 1, the value attains to cnt=1. Next, the flow proceeds to step SC008, where i=15, so that the flow proceeds to SC004. In this step, m=15 and i=15, and the flow proceeds to SC005, where the value j attains to j=2. Thus, the flow proceeds to step SC002.

Thereafter, the process of steps SC002 to SC009 is repeated while j=2 to 15, and when the value j attains to j=15 after the process of step SC008, the flow proceeds to step SC002, in which the value "j" of the counter for the vertical direction is compared with the maximum number of pixels "n" in the vertical direction. If j>n, control returns to the flow chart of FIG. 26 and step STH11 is executed. Otherwise, step SC003 is executed next. Here, j=15 and n=15, and therefore, the flow chart of FIG. 27 ends, the control returns to the flow chart of FIG. 26, and step SHT11 is executed. At this time point, difference counter is cnt=21.

In step STH11, the value of difference "cnt" calculated in accordance with the flow chart of FIG. 27 is input as the amount of increase "hcnt" when the image is displaced to the left and right, that is, hcnt=cnt. Then, the flow proceeds to step SHT12. In step SHT12, the amount of increase when displaced to left and right, that is, hcnt=21 is output.

Figure 28:
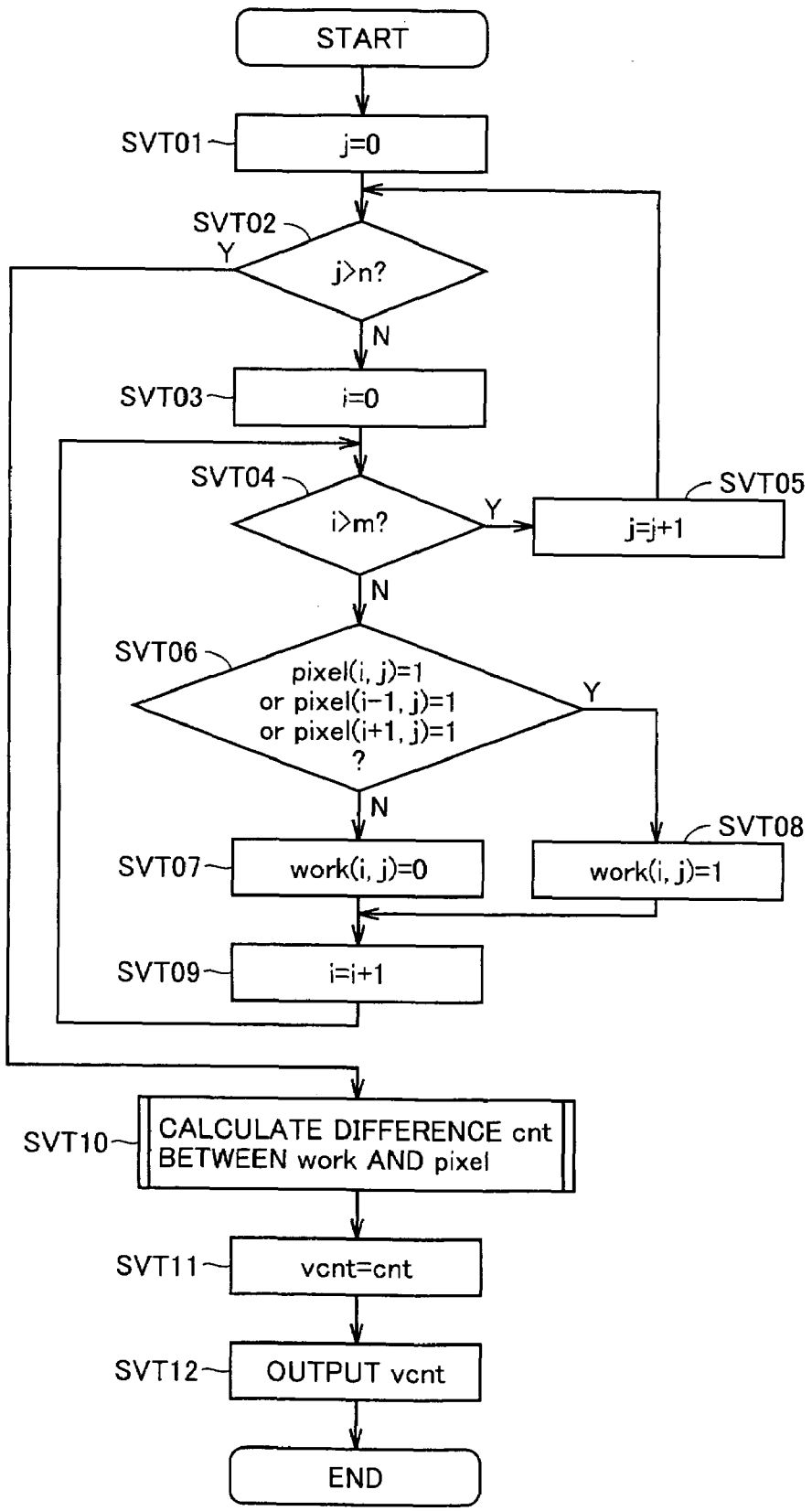
FIG. 28 is a flow chart of a process for calculating an amount of increase when the partial image is displaced upward and downward, in accordance with Embodiment 4 of the present invention.
Figure 29A:
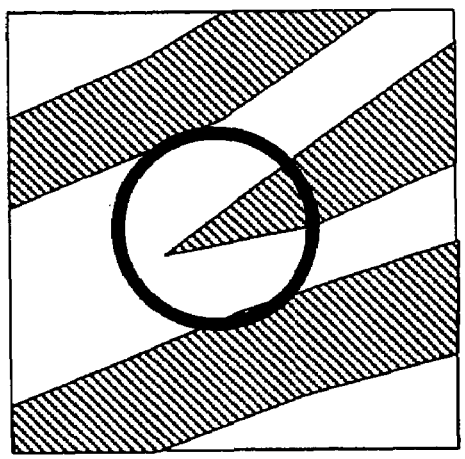
FIGS. 29A and 29B represent the image-to-image matching method as a prior art example.
Figure 29B:
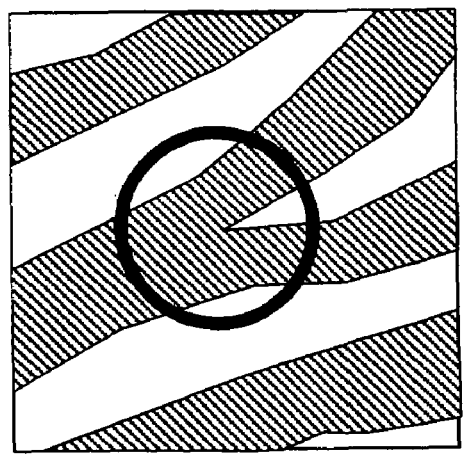

FIG. 28 is a flow chart representing the process (step ST2) for calculating the amount of increase "vcnt" when moved in the upward and downward directions in the process (step T2a) for calculating partial image feature value in accordance with Embodiment 4. Here, in steps SVT01 to SVT12, basically the same processes as those shown in the flow chart of FIG. 26 are performed, and therefore, detailed description will not be repeated.

As the amount of increase when displaced in upward and downward directions, the difference "96" between the image "Wvi" shown in FIG. 24C obtained by displacement by one pixel in upward and downward directions and superposition and the partial image "Ri" shown in FIG. 24A is output.

The processes performed on the thus output values "hcnt" and "vcnt" will be described in the following, returning to step ST3 and the following steps of FIG. 25A.

In step ST3, values "hcnt", "vcnt" and the lower limit value "vcnt0" of the maximum number of increased black pixels in the upward and downward directions are compared with each other. If vcnt>2×hcnt and vcnt≧vcnt0, step ST7 is executed next, and otherwise step ST4 is executed. At present, vcnt=96, hcnt=21 and if vcnt0 is set to vcnt0=4, the flow proceeds to step ST7. In step ST7, "H" is output to the feature value storage area of partial image "Ri" of the original image in partial image feature value calculation result memory 1024 for the reference image, or in a partial image feature value calculation result memory 1025 for the sample image, and the partial image feature value calculation end signal is transmitted to control unit 108.

If the output values of step ST2 are vcnt=30, hcnt=20 and vcnt0=4, then the flow proceeds to step ST4, if hcnt>2×vcnt and hcnt≧hcnt0, step ST5 is executed next, and otherwise step ST6 is executed.

Here, the flow proceeds to step ST6, in which "X" is output to the feature value storage area of partial image "Ri" of the original image in partial image feature value calculation result memory 1024 for the reference image, or in a partial image feature value calculation result memory 1025 for the sample image, and the partial image feature value calculation end signal is transmitted to control unit 108.

If the output values of step ST2 are vcnt=30, hcnt=70 and vcnt0=4, then the flow proceeds to step ST3, if vcnt>2×hcnt and vcnt≧vcnt0, step ST7 is executed next, and otherwise step ST4 is executed.

Here, the flow proceeds to step ST4, and if hcnt>2×vcnt and hcnt≧hcnt0, step ST5 is executed next, and otherwise step ST6 is executed.

Here, the flow proceeds to step ST5, in which "V" is output to the feature value storage area of partial image "Ri" of the original image in partial image feature value calculation result memory 1024 for the reference image, or in a partial image feature value calculation result memory 1025 for the sample image, and the partial image feature value calculation end signal is transmitted to control unit 108.

Assume that the reference image, or the sample image has a noise. By way of example, assume that the fingerprint image as the reference image or sample image is partially missing because of a furrow of the finger and as a result, the partial image "Ri" has a vertical crease at the center as shown in FIG. 24D. Even in such a case, by the calculation of partial image feature value in accordance with Embodiment 4, values hcnt=31 and vcnt=91 are obtained, as can be seen from FIGS. 24E and 24F, and if vcnt0 is set to vcnt0=4 and vcnt>2×hcnt and vcnt≧vcnt0 in step ST3, step ST7 is executed next and the value "H" representing "horizontal" can be output. Namely, the calculation of partial image feature value in accordance with Embodiment 4 can maintain calculation accuracy against noise components of the image.

As described above, partial image feature value calculating unit 1045 prepares an image WHi by displacing the partial image Ri to the left and right by a prescribed number of pixels and superposing the resulting images, and an image Wvi by displacing the partial image Ri upward and downward by a prescribed number of pixels and superposing the resulting images; calculates the increased amount of black pixels "hcnt" as a difference between the partial image Ri and the image WHi prepared by displacing the partial image to the left and right by the prescribed number of pixels and superposing, and calculates the increased amount of black pixels "vcnt" as a difference between the partial image Ri and the image Wvi prepared by displacing the partial image upward and downward by the prescribed number of pixels and superposing; based on these amounts of increase, determines whether the pattern of partial image "Ri" has a tendency to extend in the horizontal direction (tendency to be horizontal stripe) or a tendency to extend in the vertical direction (tendency to be vertical stripe) or does not have any such tendency; and outputs a value corresponding to the result of determination (any of "H", "V" and "X"). The output value is the feature value of partial image Ri.

Embodiment 5

The process functions for image collation described above are implemented by a program. In Embodiment 5, the program is stored in a computer-readable recording medium.

As for the recording medium, in Embodiment 5, the program medium may be a memory necessary for the processing by the computer, such as memory 624, or, alternatively, it may be a recording medium detachably mounted on an external storage device of the computer and the program recorded thereon may be read through the external storage device. Examples of such an external storage device are a magnetic tape device (not shown), an FD drive 630 and a CD-ROM drive 640, and examples of such a recording medium are a magnetic tape (not shown), an FD 632 and a CD-ROM 642. In any case, the program recorded on each recording medium may be accessed and executed by CPU 622, or the program may be once read from the recording medium and loaded to a prescribed storage area shown in FIG. 2, such as a program storage area of memory 624, and then read and executed by CPU 622. The program for loading is stored in advance in the computer.

Here, the recording medium mentioned above is detachable from the computer body. A medium fixedly carrying the program may be used as the recording medium. Specific examples may include tapes such as magnetic tapes and cassette tapes, discs including magnetic discs such as FD 623 and fixed disk 626 and optical discs such as CD-ROM 642/MO (Magnetic Optical Disc)/MD(Mini Disc)/DVD(Digital Versatile Disc), cards such as an IC card (including memory card)/optical card, and semiconductor memories such as a mask ROM, EPROM (Erasable and Programmable ROM), EEPROM (Electrically EPROM) and a flash ROM.

The computer shown in FIG. 2 has a configuration that allows connection to a communication network 300 including the Internet for establishing communication. Therefore, the program may be downloaded from communication network 300 and held on a recording medium in a non-fixed manner. When the program is downloaded from communication network, the program for downloading may be stored in advance in the computer, or it may be installed in advance from a different recording medium.

The contents stored in the recording medium are not limited to a program, and may include data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image collating apparatus, comprising:
   partial image feature value calculating means for calculating, on each of a plurality of partial area images set in an image, a value reflecting a pattern of the image of the partial area, wherein said partial image feature value is one of three different values and wherein said one of three different values respectively represent that said partial area image has a pattern extending along the vertical direction, a pattern extending along the horizontal direction and other pattern, and outputting the value as a partial image feature value;
   maximum matching score position searching means for searching, for each of a plurality of partial area images set in one of two images, for a maximum matching score position of the other of the two images, which is a position of a partial area image having the maximum matching score with the partial area image;
   similarity score calculating means for calculating a similarity score between the two images and outputting an image similarity score, using information related to that partial area of which positional relation amount is within a prescribed range, said positional relation amount representing positional relation between a reference position, for each of said partial areas, for measuring a position of the partial area within said one image, and said maximum matching score position corresponding to the partial area searched out by said maximum matching score position searching means; and
   determining means for determining whether said two images match or not, based on said image similarity score applied thereto; wherein
   scope of said the other image searched by said maximum matching score position searching means is selected and determined from among a plurality of partial areas set in said the other image in accordance with said partial image feature value of the partial area image set in said one image.

2. The image collating apparatus according to claim 1, further comprising
   category determining means for determining, based on the partial image feature value output by said partial image feature value calculating means for one of two images, a category to which said one image belongs; wherein
   said the other image is selected based on the category of said one image determined by said category determining means.

3. The image collating apparatus according to claim 2, wherein said the other image belongs to the same category as said one image.

4. The image collating apparatus according to claim 2, wherein
   when a plurality of images are prepared as said the other image, one image among said plurality of the other images that belong to the same category as said one image is selected with priority.

5. The image collating apparatus according to claim 1, wherein
   said maximum matching score position searching means searches that partial area set in said the other image which has the same said partial image feature value as said partial image feature value of the partial area image set in said one image.

6. The image collating apparatus according to claim 1, wherein
   when said partial image feature value of the partial area image set in said one image indicates that said pattern extends along one of said vertical direction and said horizontal direction, said maximum matching score position searching means searches that partial area of the image set in said the other image of which said partial image feature value indicates said pattern extending along said one direction and searches that partial area of the image set in said the other image of which said partial image feature value indicates said other pattern.

7. The image collating apparatus according to claim 1, wherein
said partial area having said partial image feature value indicating said other pattern is excluded from the search by said maximum matching score position searching means.

8. The image collating apparatus according to claim 1, wherein
said partial image feature value calculating means calculates maximum length of consecutive pixels along horizontal direction and maximum length of consecutive pixels along vertical direction, and outputs said partial image feature value based on values indicating respective maximum lengths.

9. The image collating apparatus according to claim 1, wherein
said partial image feature value calculating means extracts strings of pixels representative of horizontal and vertical directions, from each of said partial area images, and based on a number of changes in pixel value in each extracted string of pixels, outputs said partial image feature value.

10. The image collating apparatus according to claim 1, wherein
said partial image feature value calculating means provides, for each of said partial area images, an image by displacing the partial area image to the left and right by a prescribed number of pixels and superposing the resulting images, and an image by displacing the partial area image upward and downward by a prescribed number of pixels and superposing the resulting images; calculates a difference in pixel value between the image obtained by displacing each partial area image to the left and right by a prescribed number of pixels and superposing and the corresponding partial area image, and a difference in pixel value between the image obtained by displacing the partial area image upward and downward by a prescribed number of pixels and superposing and the corresponding partial area image; and outputs said partial image feature value based on the calculated differences.

11. An image collating method, comprising a processor to implement the steps of:
partial image feature value calculating step of calculating, on each of a plurality of partial area images set in an image, a value reflecting a pattern of the image of the partial area, wherein said partial image feature value is one of three different values and wherein said one of three different values respectively represent that said partial area image has a pattern extending along the vertical direction, a pattern extending along the horizontal direction and other pattern, and outputting the value as a partial image feature value;
maximum matching score position searching step of searching, for each of a plurality of partial area images set in one of two images, for a maximum matching score position of the other of the two images, which is a position of a partial area image having the maximum matching score with the partial area image;
similarity score calculating step of calculating a similarity score between the two images and outputting an image similarity score, using information related to that partial area of which positional relation amount is within a prescribed range, said positional relation amount representing positional relation between a reference position, for each of said partial areas, for measuring a position of the partial area within said one image, and said maximum matching score position corresponding to the partial area searched out in said maximum matching score position searching step; and
determining step of determining whether said two images match or not, based on said image similarity score applied thereto; wherein
scope of said the other image searched in said maximum matching score position searching step is selected and determined from among a plurality of partial areas set in said the other image in accordance with said partial image feature value of the partial area image set in said one image.

12. An image collating method comprising a processor to implement:
calculating, on each of a plurality of partial area images set in an image, a value reflecting a pattern of the image of the partial area, wherein said partial image feature value is one of three different values and wherein said one of three different values respectively represent that said partial area image has a pattern extending along the vertical direction, a pattern extending along the horizontal direction and other pattern, and outputting the value as a partial image feature value;
searching, for each of a plurality of partial area images set in one of two images, for a maximum matching score position of the other of the two images, which is a position of a partial area image having the maximum matching score with the partial area image;
calculating a similarity score between the two images and outputting an image similarity score, using information related to that partial area of which positional relation amount is within a prescribed range, said positional relation amount representing positional relation between a reference position, for each of said partial areas, for measuring a position of the partial area within said one image, and said maximum matching score position corresponding to the partial area searched out; and
determining whether said two images match or not, based on said image similarity score applied thereto; wherein
scope of said the other image is selected and determined from among a plurality of partial areas set in said the other image in accordance with said partial image feature value of the partial area image set in said one image.

13. A computer readable recording medium recording an image collating program causing a computer to execute an image collating method, said method including
partial image feature value calculating step of calculating, on each of a plurality of partial area images set in an image, a value reflecting a pattern of the image of the partial area, wherein said partial image feature value is one of three different values and wherein said one of three different values respectively represent that said partial area image has a pattern extending along the vertical direction, a pattern extending along the horizontal direction and other pattern, and outputting the value as a partial image feature value;
maximum matching score position searching step of searching, for each of a plurality of partial area images set in one of two images, for a maximum matching score position of the other of the two images, which is a position of a partial area image having the maximum matching score with the partial area image;
similarity score calculating step of calculating a similarity score between the two images and outputting an image similarity score, using information related to that partial area of which positional relation amount is within a prescribed range, said positional relation amount representing positional relation between a reference position, for each of said partial areas, for measuring a position of the partial area within said one image, and said maximum matching score position corresponding to the partial area searched out in said maximum matching score position searching step; and determining step of determining whether said two images match or not, based on said image similarity score applied thereto; wherein scope of said the other image searched in said maximum matching score position searching step is selected and determined from among a plurality of partial areas set in said the other image in accordance with said partial image feature value of the partial area image set in said one image.

14. An image collating apparatus, comprising:

partial image feature value calculating unit calculating, on each of a plurality of partial area images set in an image, a value reflecting a pattern of the image of the partial area, wherein said partial image feature value is one of three different values and wherein said one of three different values respectively represent that said partial area image has a pattern extending along the vertical direction, a pattern extending along the horizontal direction and other pattern, and outputting the value as a partial image feature value;

maximum matching score position searcher searching, for each of a plurality of partial area images set in one of two images, for a maximum matching score position of the other of the two images, which is a position of a partial area image having the maximum matching score with the partial area image;

similarity score calculating unit calculating a similarity score between the two images and outputting an image similarity score, using information related to that partial area of which positional relation amount is within a prescribed range, said positional relation amount representing positional relation between a reference position, for each of said partial areas, for measuring a position of the partial area within said one image, and said maximum matching score position corresponding to the partial area searched out by said maximum matching score position searcher; and determining unit determining whether said two images match or not, based on said image similarity score applied thereto; wherein scope of said the other image searched by said maximum matching score position searching means is selected and determined from among a plurality of partial areas set in said the other image in accordance with said partial image feature value of the partial area image set in said one image.

15. An image collating apparatus, comprising:

partial image feature value calculating unit calculating, on each of a plurality of partial area images set in an image, a value reflecting a pattern of the image of the partial area, wherein said partial image feature value is a plurality of different values and wherein two of said plurality of different values include a value indicating said partial area image has a pattern extending along the vertical direction and a value indicating partial area image has a pattern extending along the horizontal direction, and outputting the value as a partial image feature value;

maximum matching score position searcher searching, for each of a plurality of partial area images set in one of two images, for a maximum matching score position of the other of the two images, which is a position of a partial area image having the maximum matching score with the partial area image;

similarity score calculating unit calculating a similarity score between the two images and outputting an image similarity score, using information related to that partial area of which positional relation amount is within a prescribed range, said positional relation amount representing positional relation between a reference position, for each of said partial areas, for measuring a position of the partial area within said one image, and said maximum matching score position corresponding to the partial area searched out by said maximum matching score position searcher; and determining unit determining whether said two images match or not, based on said image similarity score applied thereto; wherein scope of said the other image searched by said maximum matching score position searching means is selected and determined from among a plurality of partial areas set in said the other image in accordance with said partial image feature value of the partial area image set in said one image.

16. The image collating apparatus according to claim 15, wherein the partial image feature value calculating unit compares the value indicating said partial area image has a pattern extending along the vertical direction and the value indicating partial area image has a pattern extending along the horizontal direction, and wherein a result of the comparison being the value of the partial image feature value outputted by the partial image feature value calculating unit.

17. The image collating apparatus according to claim 15, wherein the partial image feature value calculating unit compares the value indicating said partial area image has a pattern extending along the vertical direction and the value indicating partial area image has a pattern extending along the horizontal direction, and wherein if a result of the comparison provides a direction having a larger value being horizontal, outputting a value representing a horizontal direction being the value of the partial image feature value outputted by the partial image feature value calculating unit, if a result of the comparison provides a direction having a larger value being vertical, outputting a value representing a vertical direction being the value of the partial image feature value outputted by the partial image feature value calculating unit, and if a result of the comparison is neither of a direction having a larger value being vertical or a direction having a larger value being horizontal, outputting a predetermined value being the value of the partial image feature value outputted by the partial image feature value calculating unit.

18. An image collating method comprising a processor to implement:

calculating, on each of a plurality of partial area images set in an image, a value reflecting a pattern of the image of the partial area, wherein said partial image feature value is a plurality of different values and wherein two of said plurality of different values include a value indicating said partial area image has a pattern extending along the vertical direction and a value indicating partial area image has a pattern extending along the horizontal direction, and outputting the value as a partial image feature value;

searching, for each of a plurality of partial area images set in one of two images, for a maximum matching score position of the other of the two images, which is a position of a partial area image having the maximum matching score with the partial area image;

calculating a similarity score between the two images and outputting an image similarity score, using information related to that partial area of which positional relation amount is within a prescribed range, said positional relation amount representing positional relation between a reference position, for each of said partial areas, for measuring a position of the partial area within said one image, and said maximum matching score position corresponding to the partial area searched out; and determining whether said two images match or not, based on said image similarity score applied thereto; wherein scope of said the other image searched by said maximum matching score position searching means is selected and determined from among a plurality of partial areas set in said the other image in accordance with said partial image feature value of the partial area image set in said one image.

19. The image collating method according to claim 18, wherein the partial image feature value calculating unit compares the value indicating said partial area image has a pattern extending along the vertical direction and the value indicating partial area image has a pattern extending along the horizontal direction, and wherein a result of the comparison being the value of the partial image feature value outputted by the partial image feature value calculating unit.

20. The image collating method according to claim 18, wherein the partial image feature value calculating unit compares the value indicating said partial area image has a pattern extending along the vertical direction and the value indicating partial area image has a pattern extending along the horizontal direction, and wherein if a result of the comparison provides a direction having a larger value being horizontal, outputting a value representing a horizontal direction being the value of the partial image feature value outputted, if a result of the comparison provides a direction having a larger value being vertical, outputting a value representing a vertical direction being the value of the partial image feature value outputted, and if a result of the comparison is neither of a direction having a larger value being vertical or a direction having a larger value being horizontal, outputting a predetermined value being the value of the partial image feature value outputted.

* * * * *